(12) United States Patent
Tsubouchi et al.

(10) Patent No.: US 11,153,292 B2
(45) Date of Patent: Oct. 19, 2021

(54) AUTHENTICATION APPARATUS AND METHOD FOR CLUSTERING AND AUTHENTICATING USERS

(71) Applicant: YAHOO JAPAN CORPORATION, Tokyo (JP)

(72) Inventors: Kota Tsubouchi, Tokyo (JP); Shuuji Yamaguchi, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 329 days.

(21) Appl. No.: 15/908,155

(22) Filed: Feb. 28, 2018

(65) Prior Publication Data

US 2018/0270213 A1 Sep. 20, 2018

(30) Foreign Application Priority Data

Mar. 17, 2017 (JP) .............................. JP2017-052734

(51) Int. Cl.
| | |
|---|---|
| *H04L 29/06* | (2006.01) |
| *G06F 21/31* | (2013.01) |
| *G06F 21/45* | (2013.01) |
| *G06K 9/62* | (2006.01) |
| *G06K 9/72* | (2006.01) |
| *G06F 16/35* | (2019.01) |
| *H04W 12/60* | (2021.01) |
| *H04W 12/065* | (2021.01) |

(52) U.S. Cl.
CPC .............. *H04L 63/08* (2013.01); *G06F 16/35* (2019.01); *G06F 21/31* (2013.01); *G06F 21/316* (2013.01); *G06F 21/45* (2013.01); *G06K 9/6218* (2013.01); *G06K 9/6269* (2013.01); *G06K 9/72* (2013.01); *H04W 12/065* (2021.01); *H04W 12/60* (2021.01)

(58) Field of Classification Search
None
See application file for complete search history.

(56) References Cited

U.S. PATENT DOCUMENTS

| | | | |
|---|---|---|---|
| 8,559,684 B1 * | 10/2013 | Nechyba | G06K 9/00288 382/118 |
| 10,587,596 B1 * | 3/2020 | Sahar | H04L 63/104 |
| 2011/0295903 A1 * | 12/2011 | Chen | G06F 16/367 707/794 |

FOREIGN PATENT DOCUMENTS

JP  2011-059837 A  3/2011

* cited by examiner

*Primary Examiner* — Andrew J Steinle
(74) *Attorney, Agent, or Firm* — Oliff PLC

(57) ABSTRACT

An authentication apparatus according to the present application includes an acquiring unit, a first specifying unit, a second specifying unit, and an authentication unit. The acquiring unit acquires context information on a target user who becomes a target for authentication. The first specifying unit specifies a belonging cluster based on information related to a plurality of cluster groups and the context information on the target user, in each of the plurality of the cluster groups. The second specifying unit specifies, for each belonging cluster based on a classification model used to specify a predetermined candidate user in the belonging cluster specified by the first specifying unit, a candidate user, in a partial candidate user group that belongs to the belonging cluster, who satisfies a predetermined condition. The authentication unit authenticates the target user based on information related to the candidate user specified by the second specifying unit.

19 Claims, 13 Drawing Sheets

| USER ID | AGE | GENDER | OWN HOUSE | WORK LOCATION | INTEREST | ... |
|---|---|---|---|---|---|---|
| U1 | 20s | MALE | LC11 | LC12 | SPORTS | ... |
| U2 | 20s | FEMALE | LC21 | LC22 | GOURMET | ... |
| U3 | 30s | MALE | LC31 | LC32 | MOVIE | ... |
| U4 | 20s | MALE | LC41 | LC42 | BOOKS | ... |
| ... | ... | ... | ... | ... | ... | ... |

| USER ID | HISTORY ID | DATE AND TIME | IP ADDRESS | COMMUNICATION STANDARD | TERMINAL INFORMATION | LOCATION | USE SERVICE | SEARCH QUERY | ⋮ |
|---|---|---|---|---|---|---|---|---|---|
| U1 | LG1-1 | dt11 | IPA1-1 | CE1-1 | UA1-1 | LC1-1 | ⋮ | ⋮ | ⋮ |
| | LG1-2 | dt12 | IPA1-2 | CE1-2 | UA1-2 | – | – | – | ⋮ |
| | ⋮ | ⋮ | ⋮ | ⋮ | ⋮ | ⋮ | ⋮ | ⋮ | ⋮ |
| U2 | LG2-1 | dt21 | IPA2-1 | CE2-1 | UA2-1 | – | SV2-1 | – | ⋮ |
| | LG2-2 | dt22 | IPA2-2 | CE2-2 | UA2-2 | – | SV2-1 | – | ⋮ |
| | ⋮ | ⋮ | ⋮ | ⋮ | ⋮ | ⋮ | ⋮ | ⋮ | ⋮ |
| U3 | LG3-1 | dt31 | IPA3-1 | CE3-1 | UA3-1 | – | – | QE31 | ⋮ |
| | ⋮ | ⋮ | ⋮ | ⋮ | ⋮ | ⋮ | ⋮ | ⋮ | ⋮ |
| ⋮ | | | | | | | | | |

| CLUSTER GROUP ID (TYPE ID) | ELEMENT 1 | ELEMENT 2 | ... |
|---|---|---|---|
| CL11 | IP ADDRESS | – | ... |
| CL12 | TIME | USE SERVICE | ... |
| CL13 | AGE | GENDER | ... |

FIG.7

| CLUSTER GROUP ID (TYPE ID) | NUMBER OF CLUSTERS | CLUSTER ID | BELONGING USER | | |
|---|---|---|---|---|---|
| | | | #1 | #2 | #3 |
| CL11 (IP ADDRESS) | 4 | CL11-1 (A CLUSTER) | U1 | U44 | U189 |
| | | CL11-2 (B CLUSTER) | U54 | U211 | U1001 |
| | | CL11-3 (C CLUSTER) | U5 | U98 | U131 |
| | | CL11-4 (D CLUSTER) | ⋮ | ⋮ | ⋮ |
| CL12 (TIME × USE SERVICE) | 50 | | | | |
| CL13 (AGE × GENDER) | 10 | | | | |

| CLUSTER GROUP ID (TYPE ID) / MODEL WEIGHT | FEATURE 1 | FEATURE 2 | FEATURE 3 | ... |
|---|---|---|---|---|
| CL11 / DM11 | 0.5 | -0.4 | 0.2 | ... |
| CL12 / DM12 | -0.3 | 0.1 | -0.2 | ... |
| CL13 / DM13 | -0.5 | 1.0 | 1.2 | ... |
| CL14 / DM14 | 0 | -1.4 | -2.2 | ... |
| CL15 / DM15 | 1.5 | -2.4 | 0.3 | ... |
| CL16 / DM16 | 0.1 | 0.2 | 0.1 | ... |
| ... | ... | ... | ... | ... |

AUTHENTICATION APPARATUS AND METHOD FOR CLUSTERING AND AUTHENTICATING USERS

CROSS-REFERENCE TO RELATED APPLICATION(S)

The present application claims priority to and incorporates by reference the entire contents of Japanese Patent Application No. 2017-052734 filed in Japan on Mar. 17, 2017.

BACKGROUND OF THE INVENTION

1. Field of the Invention

The present invention relates to an authentication apparatus, an authentication method, and a non-transitory computer-readable recording medium.

2. Description of the Related Art

Conventionally, various authentication technologies have been proposed. For example, by using, as action history information on a user, various kinds of action history information related to not only purchase histories but also an entrance into and an exit form a building, joining with an acquaintance, capturing an image, and the like, there is a known technology that prevents the action history information from being biased, that makes it difficult for another person to predict action history information, and that prevents a decrease in the strength of the security of an authentication system.

Patent Document 1: Japanese Laid-open Patent Publication No. 2011-059837

However, in the conventional technology described above, it is sometimes difficult to flexibly allow a user to be authenticated in accordance with a context. For example, if a user needs to input information, such as a personal ID, that is used to identify the user, it is complicated for the user and it is difficult to authenticate the user in a flexible manner.

SUMMARY OF THE INVENTION

It is an object of the present invention to at least partially solve the problems in the conventional technology.

According to one aspect of an embodiment, an authentication apparatus includes an acquiring unit that acquires context information on a target user who becomes a target for authentication, a first specifying unit that specifies, based on information related to a plurality of cluster groups in each of which clustering is performed on, based on the type related to an element included in the context information, a candidate user group that becomes a candidate for authentication and based on the context information on the target user, in each of the plurality of the cluster groups, a belonging cluster that is a cluster to which the target user belongs, a second specifying unit that specifies, based on a classification model that is used to specify a predetermined candidate user in a partial candidate user group that belongs to the belonging cluster specified by the first specifying unit and based on the context information on the target user, for each of the belonging clusters associated with each of the plurality of the cluster groups, a candidate user, in the partial candidate user group that belongs to the belonging cluster, who satisfies a predetermined condition, and an authentication unit that authenticates the target user based on information related to the candidate user who is associated with each of the plurality of the cluster groups and who is specified by the second specifying unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a diagram illustrating an example of a user information storage unit according to the embodiment;

FIG. 5 is a diagram illustrating an example of a context information storage unit according to the embodiment;

FIG. 6 is a diagram illustrating an example of a cluster group information storage unit according to the embodiment;

FIG. 7 is a diagram illustrating an example of a cluster information storage unit according to the embodiment;

FIG. 8 is a diagram illustrating an example of a decision model information storage unit according to the embodiment;

DETAILED DESCRIPTION OF THE PREFERRED EMBODIMENTS

Figure 1:
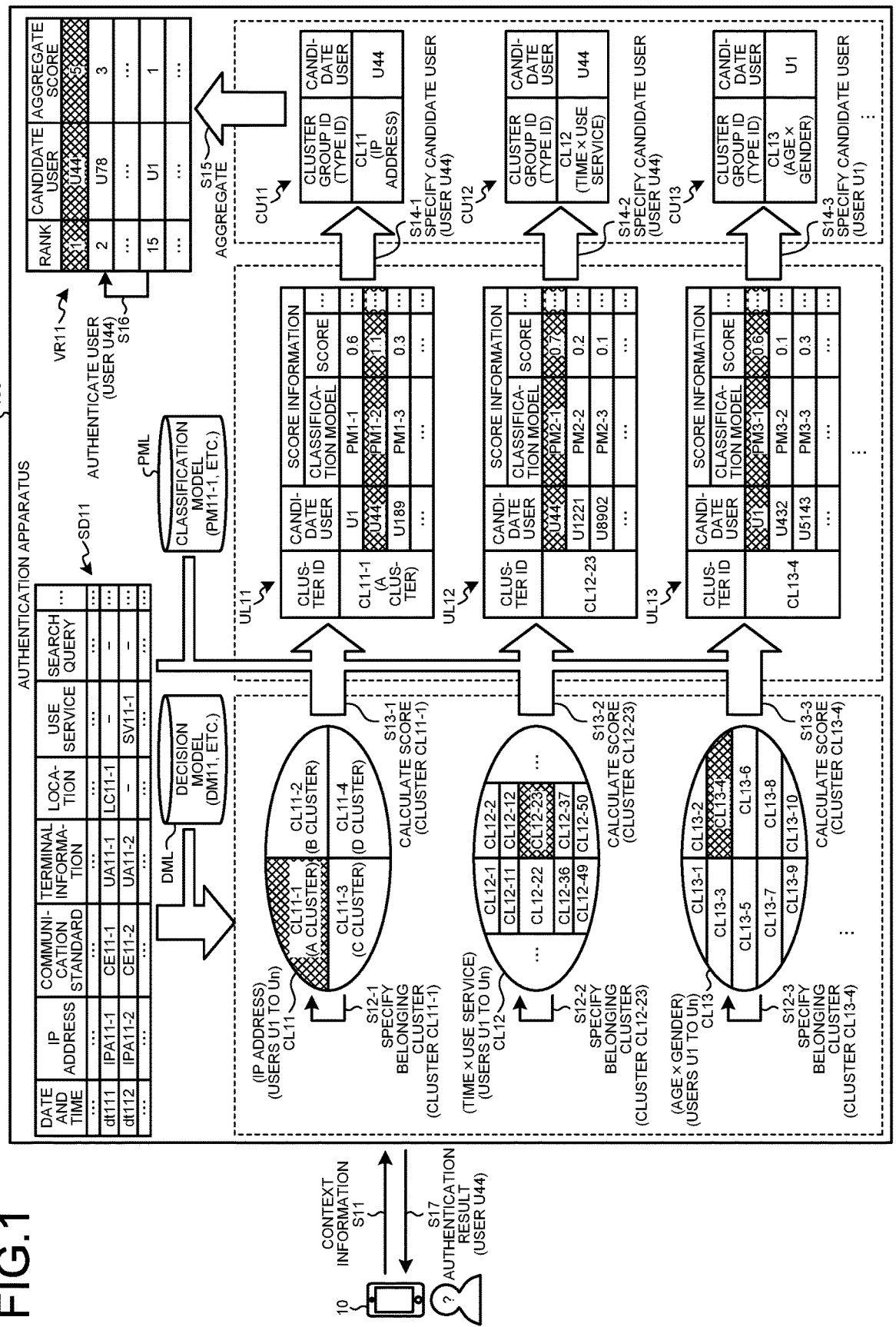
FIG. 1 is a diagram illustrating an example of an authentication process according to an embodiment.

An authentication apparatus, an authentication method, and a non-transitory computer-readable recording (storage) medium having stored therein an authentication program according to the present application will be described in detail below with reference to the accompanying drawings. The authentication apparatus, the authentication method, and the non-transitory computer-readable recording medium having stored therein the authentication program according to the present application are not limited by the embodiment. Furthermore, in the embodiments below, the same components are denoted by the same reference numerals and overlapping descriptions will be omitted.

1. Authentication Process

First, an example of an authentication process according to the embodiment will be described with reference to FIG. 1. FIG. 1 is a diagram illustrating an example of the authentication process according to an embodiment. FIG. 1 illustrates a case in which an authentication apparatus 100 authenticates a user based on information related to a context of the user acquired from a terminal device 10 (hereinafter, also simply referred to as "context information"). For example, the context mentioned here is a concept including a state or a situation of a user including an environment in which the user is placed. Furthermore, the context information will be described in detail later; however, it is assumed that, in the context information mentioned here, information that is used for the authentication apparatus 100 to uniquely specify a user who uses the terminal device 10 is not included.

Configuration of Authentication System

Figure 2:
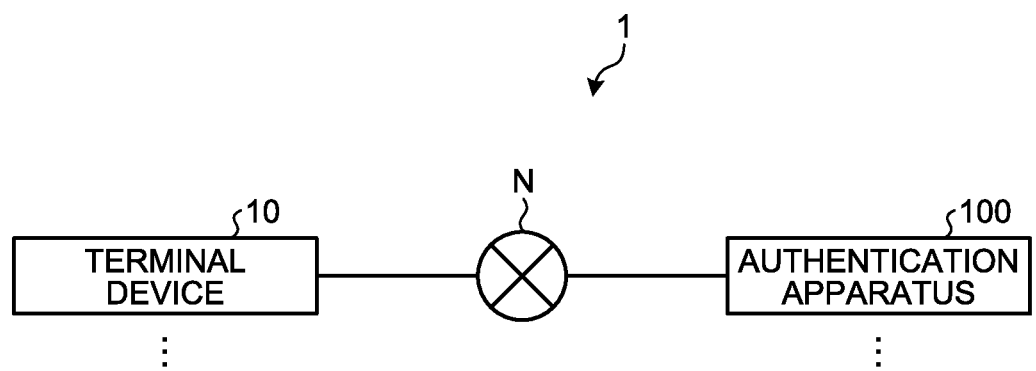
FIG. 2 is a diagram illustrating a configuration example of an authentication system according to the embodiment.

Before a description of FIG. 1, the configuration of an authentication system 1 will be described with reference to FIG. 2. FIG. 2 is a diagram illustrating a configuration example of the authentication system according to the embodiment. As illustrated in FIG. 2, the authentication system 1 includes the terminal device 10 and the authentication apparatus 100. The terminal device 10 and the authentication apparatus 100 are connected via a predetermined network N such that both can be communicated with each other in a wired or wireless manner. Furthermore, in the authentication system 1 illustrated in FIG. 2, a plurality of the terminal devices 10 and a plurality of the authentication apparatuses 100 may also be included.

The terminal device 10 is an information processing apparatus used by a user. The terminal device 10 receives various operations performed by the user. Furthermore, in a description below, the terminal device 10 is sometimes referred to as a user. Namely, in a description below, a user can also be read as the terminal device 10. Namely, in a description below, a user can also be read as the terminal device 10. Furthermore, the terminal device 10 is implemented by, for example, a smart phone, a tablet terminal, a notebook personal computer (PC), a desktop PC, a mobile phone, a personal digital assistant (PDA), or the like. The example illustrated in FIG. 1 indicates a case in which the terminal device 10 is a smart phone. Furthermore, it is assumed that the terminal device 10 has a function of a global positioning system (GPS) sensor or the like and can detect and acquire the location of a user. For example, the terminal device 10 sends action information, such as location information, to the authentication apparatus 100.

Furthermore, the terminal device 10 may also have various functions, such as a temperature sensor and an atmospheric pressure sensor, and may also be a device that can detect peripheral information indicating, for example, a temperature or an atmospheric pressure of the location of the user. Furthermore, the terminal device 10 may also have various functions, such as a heartbeat sensor, and detect and acquire biometric information on the user. For example, the terminal device 10 may also be configured such that the terminal device 10 can acquire the user's own biometric information by allowing the user who uses the terminal device 10 to attach a wearable device that can communicate with the terminal device 10. For example, the terminal device 10 may also be configured such that the terminal device 10 can acquire information related to the user's own heartbeat (pulse) by allowing the user who uses the terminal device 10 to attach a wristband type wearable device that can communicate with the terminal device 10. For example, the terminal device 10 collects various kinds of information described above and sends the collected information to the authentication apparatus 100. For example, the terminal device 10 collects pieces of context information on the user and sends the collected information to the authentication apparatus 100.

The context information on a user mentioned here is, for example, information indicating a context of the user. For example, in the context information, information related to an attribute of the user may also be included. For example, in the context information, information indicating what kind of user is may also be included. For example, in the context information, information related to various attributes, such as age, gender, profile, and interest, of the user may also be included.

For example, in the context information, information related to an action history of a user may also be included. For example, in the context information, information related to the type, the content, the time, or the location of an action of the user may also be included. For example, in the context information, information related to the type (for example, browsing or searching content, or the like) or the content (a specific news article, a search query, or the like) of the action performed by the user may also be included. For example, in the context information, information related to a use service may also be included. For example, in the context information, information related to various kinds of time or locations, such as a stay (residence) time for which a user located and stayed at the subject location, an attribute of the location (business district, residential area, etc.), and an attribute of the time (morning, night, or the like), may also be included.

For example, in the context information, information related to the terminal device 10 that is used by a user may also be included. For example, in the context information, information related to a user agent (UA) of the terminal device 10 may also be included. For example, in the user agent, various kinds of information, such as the name of an operating system (OS), the version of the OS, the name of a browser, the version of the browser, and a language, may also be included.

For example, in the context information, information related to a communication environment of the user may also be included. For example, in the context information, information related to a communication environment of the user in a communication system, such as a predetermined wireless LAN communication system including Wi-Fi (registered trademark) (Wireless Fidelity), the third generation mobile communication system (hereinafter, also referred to as "3G"), and the fourth generation mobile communication system (hereinafter, also referred to as "4G"), performed based on the communication standard of the terminal device 10 may also be included. For example, in the context information, information, such as an Internet Protocol (IP) address, related to a communication environment of a user may also be included.

For example, in the context information, information related to a context of an environment may also be included. For example, in the context information, information indicating what kind of environment is in the vicinity of the user may also be included. For example, in the context information, various kinds of information (peripheral information), such as weather, a feeling, a temperature, and an atmospheric pressure, may also be included. For example, the context information may also include information related to operation content.

For example, in the context information, information related to a situation of a user estimated based on a situation of the user or the terminal device 10 or based on an environment (background) of the terminal device 10 may also be included. Furthermore, in the context information, various kinds of information, such as the substance of the content provided to a user, the substance of the content responded by a user, an attribute of a user, the current location of a user, the current time, a physical environment in which a user is placed, a social environment in which a user is placed, an exercise state of a user, and an estimated feeling of a user, may also be included. Furthermore, in the context information, various kinds of information, such as a psychological state of a user estimated based on a situation of the user or the terminal device 10 or based on an environment (background) of the user or the terminal device 10, may also be included. The information is not limited to that described above and the context information and various kinds of information may also be included in the context information.

In the following, the authentication process illustrated in FIG. 1 will be described. In the example illustrated in FIG. 1, it is indicated a case in which authentication is performed by the authentication apparatus 100 based on the context information acquired from the terminal device 10 that is used by a user targeted for authentication (hereinafter, also referred to as a "target user"). Furthermore, in the example illustrated in FIG. 1, it is indicated a case in which the authentication apparatus 100 performs authentication as one of users who satisfies a predetermined condition in a candidate user group that includes a lot of users, such as a user U1 to a user Un. In this way, in the case where a "user U* (* is an arbitrary numerical value)" is described, the subject user indicates the user identified by the user ID "U*". For example, in the case where a "user U51" is described, the subject user is the user identified by the user ID "U51". Furthermore, the symbol "n" of "Un" is associated with the number of users who become authentication candidates and may also be, for example, "100,000", "1 million", "100 million", or the like.

Furthermore, the authentication apparatus 100 uses information related to a plurality of cluster groups in each of which clustering is performed on a candidate user group based on the type related to the element included in the context information. In the example illustrated in FIG. 1, the authentication apparatus 100 uses information related to a plurality of cluster groups, such as a cluster group CL11, a cluster group CL12, and a cluster group CL13. In this way, in the case where a "cluster group CL* (* is an arbitrary numerical value)" is described, the subject cluster group indicates the cluster group identified by the cluster group ID "CL*". For example, in the case where a "cluster group CL11" is described, this indicates that the subject cluster group is the cluster group identified by the cluster group ID "CL11".

In the example illustrated in FIG. 1, it is indicated that the cluster group CL11 is the cluster group in which clustering has been performed on the user U1 to user Un based on a single type of the element 1 "IP address". Furthermore, in the example illustrated in FIG. 1, it is indicated that the cluster group CL12 is the cluster group in which clustering has been performed on the user U1 to user Un based on the type that is a combination of the element 1 "time" and the element 2 "use service". Furthermore, in the example illustrated in FIG. 1, it is indicated that the cluster group CL13 is the cluster group in which clustering has been performed on the user U1 to user Un based on the type that is a combination of the element 1 "age" and the element 2 "gender".

Furthermore, in the example illustrated in FIG. 1, it is assumed that the cluster group CL11 has the number of clusters of "4" (see FIG. 7). For example, it is indicated that the cluster group CL11 includes an A cluster identified by a cluster ID "CL11-1", a B cluster identified by a cluster ID "CL11-2", a C cluster identified by a cluster ID "CL11-3", and a D cluster identified by a cluster ID "CL11-4". For example, the clusters included in each of the cluster groups are identified by the ID to which "-m (m is an arbitrary numerical value)" is attached to the belonging cluster group ID "CL*". In a description below, the cluster identified by the cluster ID "CL11-1" is sometimes referred to as a "cluster CL11-1". In this way, in the case where a "cluster CL*-m (* and m are arbitrary numerical values) is described, this indicates that the subject cluster is the cluster identified by the cluster ID "CL*-m". For example, in the case where a "cluster CL12-3" is described, the subject cluster is the cluster identified by a cluster ID "CL12-3".

For example, as illustrated in FIG. 7, it is indicated that, from among the user U1 to the user Un, clustering has been performed on a user U1, a user U44, and a user U189 as the users who belong to the cluster CL11-1 (hereinafter, also referred to as a "belonging user"). Furthermore, for example, as illustrated in FIG. 7, it is indicated that, from among the user U1 to the user Un, clustering has been performed on a user U54, a user U211, and a user U1001 as the belonging users of a cluster CL11-2. Furthermore, for example, as illustrated in FIG. 7, it is indicated that, from among the user U1 to the user Un, clustering has been performed on a user U5, a user U98, and a user U131 as the belonging users of a cluster CL11-3. In this way, in each cluster group, each of the users from the user U1 to the user Un in a candidate user group becomes a belonging user in an associated cluster.

Furthermore, in the example illustrated in FIG. 1, it is assumed that the cluster group CL12 has the number of clusters of "50" (see FIG. 7). For example, it is indicated that the cluster group CL12 includes a cluster CL12-1 to a cluster CL12-50 that are identified by a cluster ID "CL12-1" to a cluster ID "CL12-50", respectively.

Furthermore, in the example illustrated in FIG. 1, it is assumed that the cluster group CL13 has the number of clusters of "10" (see FIG. 7). For example, it is indicated that the cluster group CL13 includes a cluster CL13-1 to a cluster CL13-10 that are identified by a cluster ID "CL13-1" to a cluster ID "CL13-10", respectively.

Furthermore, the information related to the cluster group CL11 to the cluster group CL13 may also be created by appropriately using various clustering methods. For example, the information related to the cluster group CL11 to the cluster group CL13 may also be created by various clustering methods, such as the k-means algorithm or logistic regression using a Dirichlet Process. The authentication apparatus 100 may also perform a clustering process on the cluster group CL11 to the cluster group CL13 or the like. For example, the authentication apparatus 100 may also change the number of clusters in the group of the cluster group CL11 to the cluster group CL13 in accordance with each of the elements associated with the cluster group CL11 to the cluster group CL13 or the like. For example, the authentication apparatus 100 may also change the number of clusters in each cluster group in accordance with each of the elements associated with the cluster group CL11 to the cluster group CL13 or the like such that the number of clusters in the cluster group CL11 is four, the number of clusters in the cluster group CL12 is 10, and the number of clusters in the cluster group CL13 is 50. For example, the authentication apparatus 100 may also change the number of clusters in each cluster group by again performing clustering on each cluster group that have previously been subjected to clustering.

Furthermore, information related to the cluster group CL11 to the cluster group CL13 may also be created based on the context information stored in a context information storage unit 122 (see FIG. 5). For example, a clustering process may also be performed on each cluster group such that each of the users is appropriately classified in accordance with the type that is associated with each of the cluster groups.

For example, based on the element 1 "IP address" that is the associated type, the cluster group CL11 may also be created by appropriately using various conventional technologies described above such that each of the users stored in the context information storage unit 122 (see FIG. 5) is appropriately classified. For example, based on the element 1 "time" and the element 2 "use service" that are the associated type, the cluster group CL12 may also be created by appropriately using various conventional technologies described above such that each of the users stored in the context information storage unit 122 (see FIG. 5) is appropriately classified.

For example, based on the element 1 "age" and the element 2 "gender" that are the associated type, the cluster group CL13 may also be created by appropriately using various conventional technologies described above such that each of the users stored in the context information storage unit 122 (see FIG. 5) is appropriately classified. For example, the cluster group CL13 may also be created so as to include the cluster CL13-1 associated with "teenage males", a cluster CL13-2 associated with "males in their 20s", a cluster CL13-3 associated with "males in their 30s", a cluster CL13-4 associated with "males in their 40s", and a cluster CL13-5 associated with "males in their 50s and older". Furthermore, for example, the cluster group CL13 may also be created so as to include a cluster CL13-6 associated with "teenage females", a cluster CL13-7 associated with "females in their 20s", a cluster CL13-8 associated with "females in their 30s", a cluster CL13-9 associated with "females in their 40s", and a cluster CL13-10 associated with "females in their 50 and older".

Furthermore, the cluster group CL11-cluster group CL13 described above is an example and the user U1 to the user Un are classified into clusters, in various cluster groups, that are in accordance with the type associated with each of the cluster groups.

First, the authentication apparatus 100 acquires context information on a user from the terminal device 10 (Step S11). For example, the authentication apparatus 100 acquires the context information on a user from the terminal device 10 used by an unspecified user. In the example illustrated in FIG. 1, the authentication apparatus 100 acquires the context information on the user indicated by the acquisition context list SD11 illustrated in FIG. 1.

For example, the "date and time" illustrated in the acquisition context list SD11 indicates the date and time on which the subject context information was acquired. In the example illustrated in FIG. 1, the "date and time" is abstractly indicated by "dt111" or the like; however, a specific date and time, such as "23:31:42 on Mar. 14, 2017", may also be indicated.

Furthermore, the "IP address" illustrated in the acquisition context list SD11 indicates the IP address of the sending source of the context information. In the example illustrated in FIG. 1, the "IP address" is abstractly indicated by "IPA11-1" or the like; however, it is assumed that the "IP address" is a specific IP address, such as "131.206 . . . ", or the like. Furthermore, the "communication standard" illustrated in the acquisition context list SD11 indicates the communication standard of the sending source of the context information. For example, the "communication standard" indicates the communication standard of the sending source at the time of acquisition of the context information that is associated with each history ID. In the example illustrated in FIG. 1, the "communication standard" is abstractly indicated by "CE11-1" or the like; however, a specific communication standard, such as "Wi-Fi" or "4G", may also be indicated.

Furthermore, the "terminal information" illustrated in the acquisition context list SD11 indicates the terminal information related to the terminal device 10 that is the sending source of the context information. In the example illustrated in FIG. 1, the "terminal information" is abstractly indicated by "UA11-1" or the like; however, information related to various user agents, such as the name of an OS, the version of the OS, the name of a browser, the version of the browser, and a language, may also be included.

Furthermore, the "location" illustrated in the acquisition context list SD11 indicates the location associated with the sending source of the context information. In the example illustrated in FIG. 1, the location information is abstractly indicated by the location "LC11-1" or the like; however, the location information may also be, for example, a specific latitude or longitude.

Furthermore, the "use service" illustrated in the acquisition context list SD11 indicates the use service that is used in the terminal device 10 that is the sending source of the context information. In the example illustrated in FIG. 1, the "use service" is abstractly indicated by "SV11-1"; however, information on a specific service name, such as an X purchase application or a Y search service. Furthermore, the "search query" indicates the search query that is used for the searching in the terminal device 10 that is the sending source of the context information.

For example, in the example illustrated in FIG. 1, it is indicated that, in the acquisition context list SD11, the context information acquired on the date and time indicated by dt111 is included. Furthermore, it is indicated that, in the context information acquired on the date and time indicated by dt111, the IP address "IPA11-1", the communication standard "CE11-1, and the terminal information "UA11-1", the location "LC11-1", and the like are included. Furthermore, it is indicated that, in the context information acquired on the date and time indicated by dt111, the information, such as the use service or the search query, is not included.

For example, in the example illustrated in FIG. 1, it is indicated that, in the acquisition context list SD11, the context information acquired on the date and time indicated by dt112 is included. Furthermore, it is indicated that, in the context information acquired on the date and time indicated by dt112, the IP address "IPA11-2", the communication standard "CE11-2", the terminal information "UA11-2", the use service "SV11-1", and the like are included. Furthermore, it is indicated that, in the context information acquired on the date and time indicated by dt112, the information, such as a location or a search query, is not included.

In the example illustrated in FIG. 1, the authentication apparatus 100 performs authentication on a target user based on the context information indicated in the acquisition context list SD11. First, based on the context information indicated in the acquisition context list SD11 and based on the decision model list DML, the authentication apparatus 100 specifies, in each cluster group, a belonging cluster that is a cluster to which the target user belongs.

For example, in the decision model list DML, the models indicated by a decision model information storage unit 125 illustrated in FIG. 8 are included. For example, in the decision model list DML, decision models that are used to specify, in response to an input of context information, a belonging cluster to which a user associated with the subject context information belongs in each cluster group are included. For example, in the decision model list DML, the decision model DM11 that is used to specify, in response to an input of the context information indicated in the acquisition context list SD11, a belonging cluster of the target user in the cluster group CL11 is included.

For example, if the context information is input to the decision model DM11, the authentication apparatus 100 specifies, in accordance with the score that is output by the decision model DM11, the belonging cluster in the cluster group CL11 that is related to the user associated with the context information. For example, if the context information indicated in the acquisition context list SD11 is input to the decision model DM11, the authentication apparatus 100 specifies, in accordance with the score that is output by the decision model DM11, the belonging cluster of the target user in the cluster group CL11.

For example, the decision model DM11 may also be a model that is used for multi-class classification. For example, the authentication apparatus 100 may also determine that, when the score that is output by the decision model DM11 is "equal to or greater than 0 and is less than 0.25", the belonging cluster of the target user is the cluster CL11-1; may also determine that, when the score is "equal to or greater than 0.25 and is less than 0.5", the belonging cluster of the target user is the cluster CL11-2; and may also determine that, when the score is "equal to or greater than 0.5 and is less than 0.75", the belonging cluster of the target user is the cluster CL11-3; and may also determine that, when the score is "equal to or greater than 0.75 and is less than 1", the belonging cluster of the target user is a cluster CL11-4.

The above description is an example and the authentication apparatus 100 may also specify the belonging cluster of a target user in each cluster group by appropriately using various kinds of information. For example, if the value of the "IP address" included in the context information is within a first range, the authentication apparatus 100 may also determine that the belonging cluster of the target user is the cluster CL11-1. Furthermore, for example, if the value of the "IP address" included in the context information is within a second range, the authentication apparatus 100 may also determine that the belonging cluster of the target user is the cluster CL11-2. Furthermore, for example, if the value of the "IP address" included in the context information is within a third range, the authentication apparatus 100 may also determine that the belonging cluster of the target user is the cluster CL11-3. Furthermore, for example, if the value of the "IP address" included in the context information is within a fourth range, the authentication apparatus 100 may also determine that the belonging cluster of the target user is the cluster CL11-4.

In the example illustrated in FIG. 1, based on the context information indicated in the acquisition context list SD11, the authentication apparatus 100 determines that the belonging cluster of the target user in the cluster group CL11 is the cluster CL11-1 (Step S12-1). For example, from among the four clusters of the cluster CL11-1 to the cluster CL11-4 included in the cluster group CL11, the authentication apparatus 100 determines that the belonging cluster of a target user is the cluster CL11-1. For example, if the score that is output by the decision model DM11 to which the context information indicated in the acquisition context list SD11 is input is within a range associated with the cluster CL11-1, the authentication apparatus 100 determines that the belonging cluster of the target user is the cluster CL11-1.

Furthermore, in the example illustrated in FIG. 1, based on the context information indicated in the acquisition context list SD11, the authentication apparatus 100 determines that the belonging cluster of the target user in the cluster group CL12 is a cluster CL12-23 (Step S12-2). For example, from among the 50 clusters of the cluster CL12-1 to the cluster CL12-50 included in the cluster group CL12, the authentication apparatus 100 determine that the belonging cluster of the target user is the cluster CL12-23. For example, if the score that is output by the decision model DM12 to which the context information indicated in the acquisition context list SD11 is input is within the range associated with the cluster CL12-23, the authentication apparatus 100 determines that the belonging cluster of the target user is the cluster CL12-23.

Furthermore, in the example illustrated in FIG. 1, based on the context information indicated in the acquisition context list SD11, the authentication apparatus 100 determines that the belonging cluster of the target user in the cluster group CL13 is the cluster CL13-4 (Step S12-3). For example, from among the 10 clusters of cluster CL13-1 to the cluster CL13-10 included in the cluster group CL13, the authentication apparatus 100 determines that the belonging cluster of the target user is the cluster CL13-4. For example, if the score that is output by the decision model DM13 to which the context information indicated in the acquisition context list SD11 is input is within the range associated with the cluster CL13-4, the authentication apparatus 100 determines that the belonging cluster of the target user is the cluster CL13-4.

Then, the authentication apparatus 100 specifies candidate users who satisfy a predetermined condition and who are in the belonging user group that belongs to each of the specified belonging clusters (hereinafter, also referred to as a "partial candidate user group"). In the example illustrated in FIG. 1, based on the context information indicated in the acquisition context list SD11 and based on the classification model list PML, the authentication apparatus 100 specifies a candidate user related to the target user in the partial candidate user group included in each of the belonging clusters.

Figure 9:
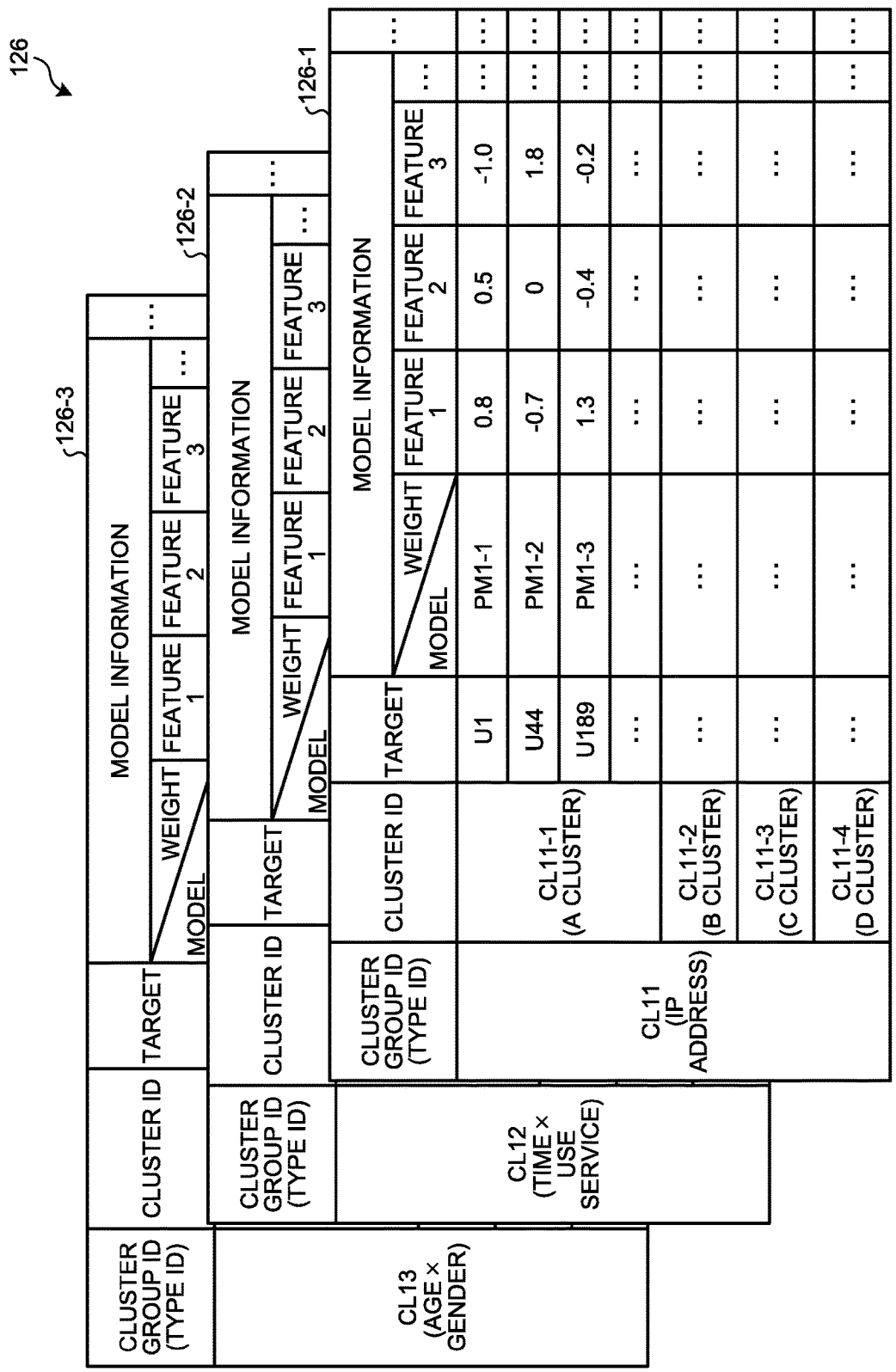
FIG. 9 is a diagram illustrating an example of a classification model information storage unit according to the embodiment.

For example, in the classification model list PML, the models indicated in a classification model information storage unit 126 illustrated in FIG. 9 are included. For example, the classification model list PML includes classification models that are used to specify, in response to an input of the context information, the user who is associated with the subject context information and who is highly likely to be one of the candidate users in the partial candidate user group. In the example illustrated in FIG. 1, in the classification model list PML, as indicated in the classification model information storage unit 126 illustrated in FIG. 9, the classification models associated with the corresponding candidate users are included. In response to an input of the context information indicated in the acquisition context list SD11, the decision model DM11 that is used to specify the belonging cluster of the target user in the cluster group CL11 is included.

For example, in the classification model list PML, a classification model PM1-1 (see FIG. 9) associated with the user U1 in the cluster CL11-1 is included. For example, as indicated in the classification model information storage unit 126 illustrated in FIG. 9, the model information related to the classification model PM1-1 indicates that the weight of a feature 1 is "0.8", the weight of a feature 2 is "0.5", the weight of a feature 3 is "−1.0", and the like. Furthermore, for example, in the classification model list PML, a classification model PM1-2 associated with a user U44 in the cluster CL11-1 is included. Furthermore, for example, in the classification model list PML, a classification model PM1-3 associated with a user U189 in the cluster CL11-1 is included.

Furthermore, for example, in the classification model list PML, a classification model PM2-1 associated with the user U44 in the cluster CL12-23 is included. Furthermore, it is assumed that the classification model PM1-2 associated with the user U44 in the cluster CL11-1 and the classification model PM2-1 associated with the user U44 in the cluster CL12-23 are different models. For example, it is assumed that the classification model PM1-2 associated with the user U44 in the cluster CL11-1 and the classification model PM2-1 associated with the user U44 in the cluster CL12-23 may also be the models that have a common feature and different weights. Furthermore, for example, in the classification model list PML, a classification model PM2-2 associated with a user U1221 in the cluster CL12-23 is included. Furthermore, for example, in the classification model list PML, the classification model PM2-3 associated with a user U8902 in the cluster CL12-23 is included.

Furthermore, for example, in the classification model list PML, a classification model PM3-1 associated with the user U1 in the cluster CL13-4 is included. Furthermore, for example, in the classification model list PML, a classification model PM3-2 associated with a user U432 in the cluster CL13-4 is included. Furthermore, for example, in the classification model list PML, a classification model PM3-3 associated with a user U5143 in the cluster CL13-4 is included.

In the example illustrated in FIG. 1, based on the context information indicated by the acquisition context list SD11 and based on the classification model PM1-1 to the classification model PM1-3 or the like, the authentication apparatus 100 specifies the score of each of the users included in the candidate user group of the cluster CL11-1 (Step S13-1). For example, as indicated by the candidate user group information UL11, the authentication apparatus 100 specifies the score of the user U1, the user U44, the user U189, and the like included in the candidate user group of the cluster CL11-1.

For example, based on the context information indicated in the acquisition context list SD11 and based on the classification model PM1-1, the authentication apparatus 100 determines that the score of the user U1 in the cluster CL11-1 is "0.6". Furthermore, for example, based on the context information indicated in the acquisition context list SD11 and based on the classification model PM1-2, the authentication apparatus 100 determines that the score of the user U44 in the cluster CL11-1 is "1.1".

Furthermore, in the example illustrated in FIG. 1, based on the context information indicated in the acquisition context list SD11 and based on the classification model PM2-1 to a classification model PM2-3 or the like, the authentication apparatus 100 specifies the score of each of the users included in the candidate user group of the cluster CL12-23 (Step S13-2). For example, as indicated by the candidate user group information UL12, the authentication apparatus 100 specifies the score of the user U44, the user U1221, the user U8902, and the like included in the candidate user group of the cluster CL12-23.

Furthermore, in the example illustrated in FIG. 1, based on the context information indicated in the acquisition context list SD11 and based on the classification model PM3-1 to the classification model PM3-3 or the like, the authentication apparatus 100 specifies the score of each of the users included in the candidate user group of the cluster CL13-4 (Step S13-3). For example, as indicated by the candidate user group information UL13, the authentication apparatus 100 specifies the score of the user U1, the user U432, the user U5143, and the like included in the candidate user group of the cluster CL13-4.

Then, based on the score of each of the candidate user groups, the authentication apparatus 100 specifies a candidate user in each of the cluster groups. In the example illustrated in FIG. 1, the authentication apparatus 100 specifies, as the candidate user, the user having the maximum score from among the users included in each of the candidate user groups in each of the cluster groups.

In the example illustrated in FIG. 1, based on the score of each of the candidate users indicated in the candidate user group information UL11, the authentication apparatus 100 specifies a candidate user in the cluster group CL11 (Step S14-1). For example, as indicated in the candidate user specific information CU11, the authentication apparatus 100 determines that the candidate user in the cluster group CL11 is the user U44 who has the maximum score of "1.1".

Furthermore, in the example illustrated in FIG. 1, based on the score of each of the candidate users indicated in the candidate user group information UL12, the authentication apparatus 100 specifies a candidate user in the cluster group CL12 (Step S14-2). For example, as indicated in the candidate user specific information CU12, the authentication apparatus 100 determines that the candidate user in the cluster group CL12 is the user U44 who has the maximum score of "0.7".

Furthermore, in the example illustrated in FIG. 1, based on the score of each of the candidate users indicated in the candidate user group information UL13, the authentication apparatus 100 specifies a candidate user in the cluster group CL13 (Step S14-3). For example, as indicated in the candidate user specific information CU13, the authentication apparatus 100 determines that the candidate user in the cluster group CL13 is the user U1 who has the maximum score of "0.6".

Then, the authentication apparatus 100 aggregates information related to the candidate users specified in each cluster group (Step S15). For example, as indicated in the aggregate information VR11, the authentication apparatus 100 specifies the aggregate score based on the information related to the candidate users as indicated in candidate user specific information CU11 to candidate user specific information CU13. For example, the authentication apparatus 100 counts the number of times each of the users appears in the candidate user specific information CU11 to the candidate user specific information CU13 and then sets the counted result to the aggregate score. For example, the authentication apparatus 100 determines that the aggregate score of the user U44 who has appeared five times as the candidate user in each cluster group is "5". For example, the authentication apparatus 100 determines that the aggregate score of a user U78 who has appeared three times as the candidate user in each cluster group is "3". For example, the authentication apparatus 100 determines that the aggregate score of the user U1 who has appeared once as the candidate user in each cluster group is "1".

Then, the authentication apparatus 100 authenticates the target user based on the information related to the candidate user associated with each of the plurality of cluster groups (Step S16). In the example illustrated in FIG. 1, from among the candidate user indicated in the aggregate information VR11, the authentication apparatus 100 authenticates the target user as the user U44 who is the first ranked candidate user. Namely, from among the candidate users indicated in the aggregate information VR11, the authentication apparatus 100 authenticates the target user as the user U44 who has the maximum aggregate score.

Then, the authentication apparatus 100 notifies the terminal device 10 of the authentication result (Step S17). For example, the authentication apparatus 100 notifies the terminal device 10 of the authentication result indicating that the user U44 has been authenticated.

As described above, the authentication apparatus 100 authenticates a user based on the context information on the user. Consequently, the authentication apparatus 100 can allow a user to be authenticated in accordance with a context of a user. For example, due to the reason that a complicated authentication method, such as inputting a password, is inconvenient for a user, when context authentication is performed by using a conventional method, the context authentication is difficult because there are too many target users. For example, it is difficult to appropriately authenticate a user by simply performing learning (creating a model) targeted for all of the users in the process of context authentication because there are too many target users. For example, if users with a huge number of user (for example, 80 million) are targeted for authentication, because the number of elements and the amount of data to be considered in authentication is vast, there is a problem in that an amount of calculation is huge and a long processing time is needed. For example, if the number of users who are included in candidate user groups and who become the candidates for authentication is 80 million, it is difficult to classify the candidate user groups by using multi-class classification. Thus, the authentication apparatus 100 previously perform clustering on the candidate user groups. In contrast, if clustering is performed on the candidate user groups and the candidate user groups are narrowed down by clustering, it is difficult to appropriately authenticate a target user because a target user is not included in the subject cluster. Thus, the authentication apparatus 100 performs clustering on the candidate user groups based on a plurality of references (types). Then, based on the plurality of references (types) and based on the result of aggregating information related to the specified candidate users, the authentication apparatus 100 authenticates a target user. Consequently, even if a cluster that does not include a target user is specified in a single cluster group, because the authentication apparatus 100 authenticates a target user by comprehensively using the information related to a plurality of cluster groups, the authentication apparatus 100 can appropriately authenticate the target user. In this way, the authentication apparatus 100 performs the authentication process by narrowing down (dividing) the sets, which become the targets, for each cluster group and by comprehensively using each of the results. For example, because the authentication apparatus 100 can specify a candidate user after having narrowed down the targets (dividing), the authentication apparatus 100 can narrow down the sets that become the targets for the process. Consequently, the authentication apparatus 100 can further reduce the amount of calculation or the processing time needed to perform authentication on all of the targets.

In the example illustrated in FIG. 1, the authentication apparatus 100 performs clustering on the candidate user groups in each of a plurality of cluster groups, such as the cluster group CL11 to the cluster group CL13. For example, when the authentication apparatus 100 performs clustering a candidate user group, such as the cluster group CL13, into 10 clusters, if the number of users in the candidate user group is 80 million, the number of users included in each of the cluster is 8 million users on average. In this way, the authentication apparatus 100 can narrow down the number of candidate users by performing clustering on the candidate user groups in each of the plurality of cluster groups, such as the cluster group CL11 to the cluster group CL13. Then, the authentication apparatus 100 specifies the narrowed down the candidate users by using the user groups as the target, which makes it possible to appropriately specify the candidate users when compared in a case of specifying 80 million users as the target at a time.

1-1. Classification Model

In the example described above, a case in which the authentication apparatus 100 uses a classification model created for each user in a candidate user group in each cluster group has been described; however, the authentication apparatus 100 may also use various classification models. For example, the authentication apparatus 100 may also specify predetermined users as candidate users in the candidate user group in each of the clusters by using the classification model created for each cluster in each cluster group.

For example, the authentication apparatus 100 may also use a multi-class classification model as a classification model. For example, the authentication apparatus 100 may also specify candidate users by using a model that can cope with the so-called multi-label problem. For example, the authentication apparatus 100 may also specify candidate users by using a technology related to kernel methods. For example, the authentication apparatus 100 may also specify candidate users by using a technique that multi-dimensionally classifies space in combination with a special feature value (for example, the square of x, etc.). Furthermore, for example, the authentication apparatus 100 may also specify candidate users by using a technology related to non-linear classification.

For example, regarding a past log of a user, the authentication apparatus 100 may also specify candidate users by converting a multidimensional feature value to a value or by mapping the feature value to multidimensional vector space. For example, the authentication apparatus 100 may also place (mapping) the acquired context information onto a value or space and may also specify, as candidate users, users associated with the points that are present in the vicinity of the point (location) associated with the subject context information. Furthermore, the above descriptions are examples and the authentication apparatus 100 may also use any kind of information as long as the authentication apparatus 100 can specify candidate users.

1-2. Purpose of Authentication

In the example described above, in order to simplify the description, an example in which an authentication result is reported to the terminal device 10 has been described; however, the authentication apparatus 100 may also provide the authentication result to various external devices. For example, the authentication apparatus 100 may also provide the authentication result to an external device that provides a service used by the terminal device 10. Furthermore, the authentication apparatus 100 may also provide various services based on the authentication result. Furthermore, the authentication system 1 may also be used in various authentication fields. For example, the service of context authentication provided by the authentication apparatus 100 may also be used in various fields. For example, the authentication process performed by the authentication apparatus 100 may also be used in an account recovery service. Furthermore, for example, the authentication process performed by the authentication apparatus 100 may also be used for delegation of authority or the like.

1-3. Creating Each Model

Furthermore, the authentication apparatus 100 may also create a classification model or the like based on the context information acquired from the terminal device 10. For example, the authentication apparatus 100 may also create a classification model or the like, such as the model indicated by the context information storage unit 122, by using context information that is associated with each of the users. For example, the authentication apparatus 100 may also create a classification model or the like based on correct information (positive example) and incorrect information (negative example). For example, the authentication apparatus 100 may also create a classification model or the like based on the context information in the case where authentication is correctly performed on a user and based on information (for example, user ID) that can uniquely specify a user. For example, the authentication apparatus 100 may also determine, in the cluster CL11-1 in the cluster group CL11, that a candidate user is the user U1 and create a classification model of the cluster CL11-1 by using the context information in the case where the target user is the user U1 as a positive example. For example, the authentication apparatus 100 may also determine, in the cluster CL11-1 in the cluster group CL11, that a candidate user is the user U1 and create the classification model PM1-1 of the cluster CL11-1 by using the context information in the case where the target user is the user U1 as a positive example.

Furthermore, each of the models may also be suitably created by using various conventional technologies related to machine learning. For example, a model may also be created by using a technology related to machine learning of supervised learning, such as a support vector machine (SVM). Furthermore, for example, a model may also be created by using a technology related to machine learning of unsupervised learning. For example, a model may also be created by using a technology related to deep learning. For example, a model may also be created by suitably using a technology of various kinds of deep learning, such as a deep neural network (DNN), a recurrent neural network (RNN), and a convolutional neural network (CNN). Furthermore, the description about creating the above described models is exemplified and a model may also be created by using a learning method that is suitably selected in accordance with, for example, information that can be acquired.

2. Configuration of the Authentication Apparatus

Figure 3:
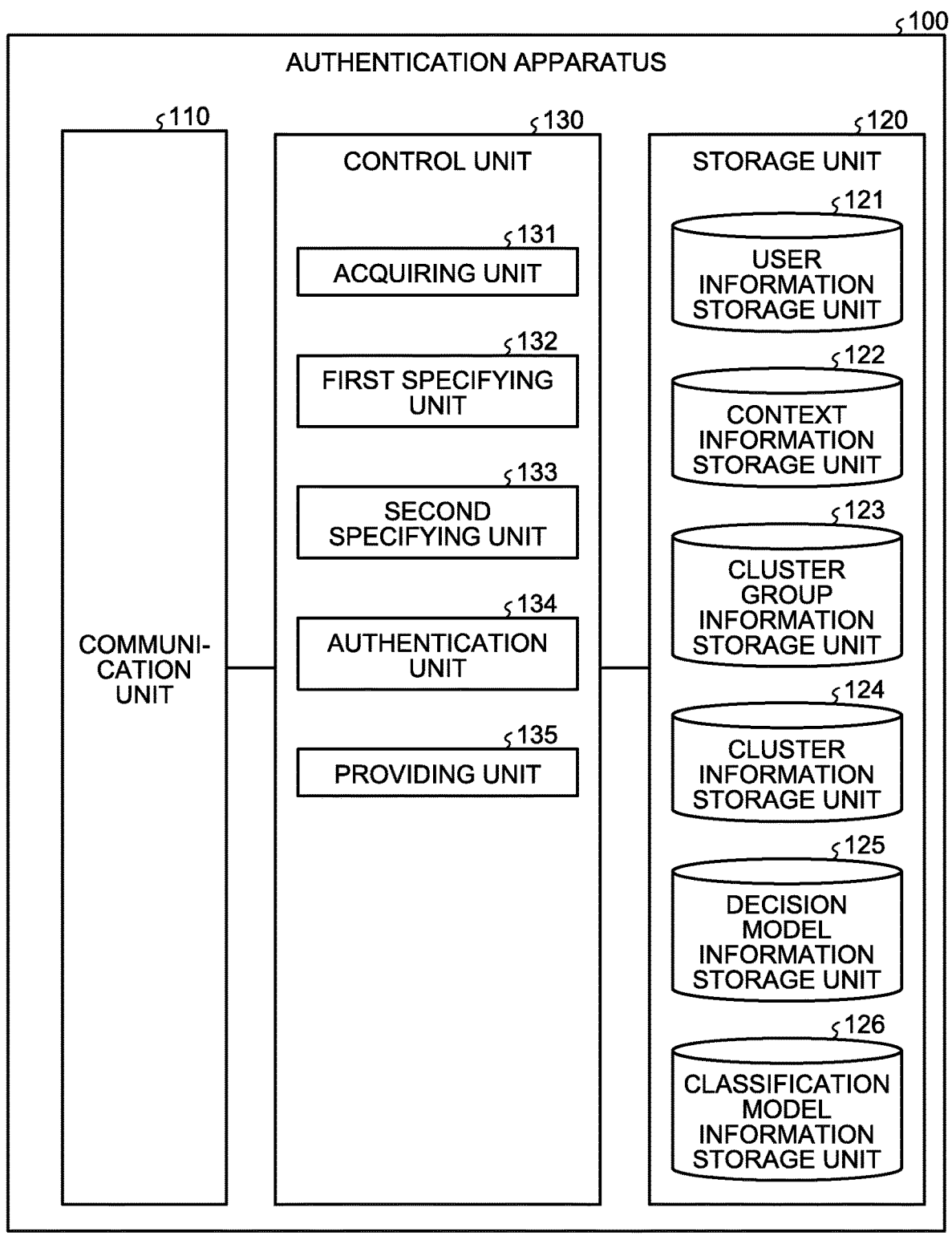
FIG. 3 is a diagram illustrating a configuration example of an authentication apparatus according to the embodiment.

In the following, the configuration of the authentication apparatus 100 according to the embodiment will be described with reference to FIG. 3. FIG. 3 is a diagram illustrating a configuration example of the authentication apparatus 100 according to the embodiment. As illustrated in FIG. 3, the authentication apparatus 100 includes a communication unit 110, a storage unit 120, and a control unit 130. Furthermore, the authentication apparatus 100 may also include an input unit (for example, a keyboard, a mouse, etc.) that receives various operations from an administrator or the like of the authentication apparatus 100 and may also include a display unit (for example, a liquid crystal display, etc.) that is used to display various kinds of information.

Communication Unit 110

The communication unit 110 is implemented by, for example, a network interface card (NIC), or the like. Furthermore, the communication unit 110 is connected to the network 2 in a wired or wireless manner and sends and receives information to and from the terminal device 10.

Storage Unit 120

The storage unit 120 is implemented by, for example, a semiconductor memory device, such as a random access memory (RAM) or a flash memory, or a storage device, such as a hard disk or an optical disk. The storage unit 120 according to the embodiment includes, as illustrated in FIG. 3, a user information storage unit 121, the context information storage unit 122, a cluster group information storage unit 123, a cluster information storage unit 124, the decision model information storage unit 125, and the classification model information storage unit 126.

User Information Storage Unit 121

The user information storage unit 121 according to the embodiment stores therein various kinds of information related to users. For example, the user information storage unit 121 stores therein various kinds of information related to the user attributes. FIG. 4 is a diagram illustrating an example of the user information storage unit according to the embodiment. The user information storage unit 121 illustrated in FIG. 4 has items, such as "user ID", "age", "gender", "own house", "work location", "interest", and the like.

The "user ID" indicates identification information for identifying a user. The "age" indicates the age of the user identified by the user ID. Furthermore, the "age" may also be a specific age, such as, 35 years old, of the user identified by the user ID. The "gender" indicates the gender of the user identified by the user ID.

The "own house" indicates location information on the own house of the user identified by the user ID. Furthermore, in the example illustrated in FIG. 4, the "own house" is indicated by an abstract symbol, such as "LC11"; however, the "own house" may also be information indicating latitude and longitude. Furthermore, for example, the "own house" may also be a region name or an address.

The "work location" indicates location information on a work location of the user identified by the user ID. Furthermore, in the example illustrated in FIG. 4, the "work location" is indicated by an abstract symbol, such as "LC12"; however, the "work location" may also be information indicating latitude and longitude. Furthermore, for example, the "work location" may also be a region name or an address.

The "interest" indicates interest of the user identified by the user ID. Namely, the "interest" indicates a target of high interest expressed by the user identified by the user ID. Furthermore, in the example illustrated in FIG. 4, a single piece of "interest" is indicated for each user; however, a plurality of pieces of "interest" may also be indicated.

For example, in the example illustrated in FIG. 4, the age of the user identified by the user ID "U1" is "20s" and the gender is "male". Furthermore, for example, the user identified by the user ID "U1" indicates that the own house is "LC11". Furthermore, for example, the user identified by the user ID "U1" indicates that the work location is "LC12". Furthermore, for example, the user identified by the user ID "U1" indicates that the user is interested in "sports".

Furthermore, the information is not limited to those described above and the user information storage unit 121 may also store therein various kinds of information in accordance with purposes. For example, the user information storage unit 121 may also store therein information, such as a name, a family structure, or an income.

Context Information Storage Unit 122

The context information storage unit 122 according to the embodiment stores therein various kinds of information related to a context of a user. FIG. 5 is a diagram illustrating an example of the context information storage unit according to the embodiment. The context information storage unit 122 stores therein context information on users.

In the example illustrated in FIG. 5, the context information storage unit 122 stores therein context information associated with each of the users. For example, the context information storage unit 122 stores therein correct information (positive example). For example, the context information storage unit 122 stores, as a positive example, context information in the case where authentication has correctly been performed on each of the users or context information acquired together with information (for example, a user ID) that can uniquely specify a user by associating the context information with the user. The context information storage unit 122 illustrated in FIG. 5 has items, such as "user ID", "history ID", "date and time", "IP address", "communication standard", "terminal information", "location", "use service", "search query", and the like. The items described above are examples and various items related to the context information may also be included. For example, in the context information storage unit 122, various items, such as "temperature", "humidity", "acceleration", may also be included as the items related to the context information.

The "user ID" indicates identification information for identifying a user. The "history ID" indicates identification information for identifying the acquired context information. For example, the context information associated with the same history ID is the context information acquired from the same sending source.

The "date and time" indicates the date and time associated with each of the history IDs. For example, the "date and time" indicates the date and time on which the context information associated with each of the history IDs was acquired. In the example illustrated in FIG. 5, the "date and time" is abstractly indicated by "dt11" or the like; however specific date and time, such as "23:31:42 on Mar. 14, 2017", may also be stored.

Furthermore, the "IP address" indicates the IP address of the sending source on the context information. In the example illustrated in FIG. 5, the "IP address" is abstractly indicated by "IPA1-1" or the like; however, a specific IP address, such as "131.206 . . . ", may also be stored. Furthermore, various versions, such as Internet protocol version 4 (IPv4) or Internet protocol version 6 (IPv6), may also be used for the "IP address".

The "communication standard" indicates the communication standard of the sending source of the context information. For example, the "communication standard" indicates the communication standard of the sending source at the time of acquisition of the context information that is associated with each of the history IDs. In the example illustrated in FIG. 5, the "communication standard" is abstractly indicated by "CE1-1" or the like; however, a specific communication standard, such as "Wi-Fi" or "4G", may also be stored.

The "terminal information" indicates terminal information related to the terminal device 10 that is the sending source of the context information. For example, in the "terminal information", information related to the user agent of the terminal device 10 that is the sending source may also be stored. In the example illustrated in FIG. 5, the "terminal information" is abstractly indicated by "UA1-1" or the like; however, various kinds of information, such as the name of an OS, the version of the OS, the name of a browser, the version of the browser, and a language, may also be stored.

The "location" indicates a location associated with each of the history IDs. For example, the "location" indicates a location of the terminal device 10 at the time of acquisition of the context information that is associated with each of the history IDs. In the example illustrated in FIG. 5, location information is indicated by an abstract symbol, such as the location "LC1-1"; however, the information stored in the item of "location" may also be location information, such as specific latitude and longitude.

The "use service" indicates a use service that is used in the terminal device 10 that is the sending source of the context information. For example, in the "use service", information related to a service that is being used on the associated date and time may also be stored. In the example illustrated in FIG. 5, the "use service" is abstractly indicated by "SV2-1" or the like; however, information on a specific service name or the like, such as an X purchase application or a Y search service, may also be stored.

The "search query" indicates a search query used for a search performed in the terminal device 10 that is the sending source of the context information. For example, in the "search query", information related to a search query used for a search performed on the associated date and time in the terminal device 10 that is the sending source may also be stored. In the example illustrated in FIG. 5, the "search query" is abstractly indicated by "QE31" or the like; however, information on a specific query (a character string, an image, etc.), such as "Z purse" or "gourmet in an A prefecture", may also be stored.

For example, the example illustrated in FIG. 5 indicates that, regarding the user identified by the user ID "U1", the context information associated with the history ID "LG1-1" was acquired on the date and time dt11. Furthermore, it is indicated that, in the context information associated with the history ID "LG1-1", the IP address "IPA1-1", the communication standard "CE1-1", the terminal information "UA1-1", the location "LC1-1", and the like are included. Furthermore, it is indicated that, in the context information associated with the history ID "LG1-1", the use service and the search query is "-", which indicates that, in the context information associated with the history ID "LG1-1", information on the use service, the search query, and the like are not included.

The information is not limited to the above and the context information storage unit 122 may also store various kinds of information in accordance with purposes. Furthermore, FIG. 5 illustrates a case in which the action information is stored in the context information storage unit 122 for each user ID; however, action information does not need to be stored for each user ID but may also be stored in the order of, for example, date and time.

Cluster Group Information Storage Unit 123

The cluster group information storage unit 123 according to the embodiment stores therein various kinds of information related to elements of each cluster group. FIG. 6 is a diagram illustrating an example of the cluster group information storage unit according to the embodiment. For example, the cluster group information storage unit 123 stores therein elements with the type associated with each cluster group. For example, the cluster group information storage unit 123 stores therein a combination of each of the elements constituting various types. The cluster group information storage unit 123 illustrated in FIG. 6 includes items, such as "cluster group ID (type ID)", "element 1", "element 2", and the like. Furthermore, in the example illustrated in FIG. 6, in the cluster group information storage unit 123, the items, such as "element 3", "element 4", and the like, are included in accordance with the number of elements constituting the type associated with each cluster group are included. The above items are examples and, various kinds of information may also be included in each of the elements constituting the type.

The "cluster group ID (type ID)" indicates identification information for identifying each cluster group. The "element 1", the "element 2", and the like indicate a combination of each of the elements constituting the type associated with the cluster group.

In the example illustrated in FIG. 6, it is indicated that the cluster group identified by the cluster group ID "CL11" is the cluster group that has been subjected to clustering based on a single type of the element 1 "IP address". Furthermore, in the example illustrated in FIG. 6, it is indicated that the cluster group identified by the cluster group ID "CL12" is the cluster group that has been subjected to clustering based on the type that is formed by combining the element 1 "time" and the element 2 "use service". Furthermore, in the example illustrated in FIG. 6, it is indicated that the cluster group identified by the cluster group ID "CL13" is the cluster group that has been subjected to clustering based on the type that is formed by combining the element 1 "age" and the element 2 "gender".

Furthermore, the information is not limited to that described above and the cluster group information storage unit 123 may also store therein various kinds of information in accordance with purposes. Furthermore, in the example illustrated in FIG. 6, in order to simplify the description, as the type, only a combination of two or less elements are illustrated; however, a combination of three or more elements may also be included in the type. For example, in the cluster group stored in the cluster group information storage unit 123, a cluster group associated with the type formed by combining the element 1 "communication environment", the element 2 "terminal information", and the element 3 "location" may also be included.

Cluster Information Storage Unit 124

The cluster information storage unit 124 according to the embodiment stores therein various kinds of information relates to clusters. FIG. 7 is a diagram illustrating an example of the cluster information storage unit according to the embodiment. The cluster information storage unit 124 illustrated in FIG. 7 stores therein various kinds of information related to clusters for each cluster group. In the example illustrated in FIG. 7, the cluster information storage unit 124 stores therein information (table) for each cluster group, such as a cluster information group 124-1, a cluster information group 124-2, a cluster information group 124-3, and the like. The cluster information group 124-1, the cluster information group 124-2, the cluster information group 124-3, and the like illustrated in FIG. 7 have items, such as "cluster group ID (type ID)", "number of clusters", "cluster ID", "belonging user", and the like.

The "cluster group ID (type ID)" indicates identification information for identifying each cluster group. The "number of clusters" indicates the number of clusters included in the associated cluster group. The "cluster ID" indicates identification information for identifying each of the clusters included in an associated cluster group. The "belonging user" indicates the user who belongs to the associated cluster.

In the example illustrated in FIG. 7, it is indicated that the cluster group identified by the cluster group ID "CL11" includes four clusters. For example, it is indicated that, in the cluster group identified by the cluster group ID "CL11", the A cluster identified by the cluster ID "CL11-1", the B cluster identified by the cluster ID "CL11-2", the C cluster identified by the cluster ID "CL11-3", and the D cluster identified by the cluster ID "CL11-4" are included. Furthermore, it is indicated that, in the A cluster identified by the cluster ID "CL11-1", the user identified by the user ID "U1", the user identified by the user ID "U44", and the user identified by the user ID "U189" are included in the belonging user.

Furthermore, the information is not limited to that described above and the cluster information storage unit 124 may also store therein various kinds of information in accordance with purposes.

Decision Model Information Storage Unit 125

The decision model information storage unit 125 according to the embodiment stores therein information related to learning. For example, the decision model information storage unit 125 stores therein models. For example, the decision model information storage unit 125 stores therein information on the entire model created by the authentication process. FIG. 8 is a diagram illustrating an example of the decision model information storage unit according to the embodiment. The decision model information storage unit 125 illustrated in FIG. 8 has items, as model information, such as "cluster group ID (type ID)", "feature 1" to "feature 3", and the like, in association with decision models DM11 to DM16. The "cluster group ID (type ID)" indicates identification information for identifying each of the cluster groups.

In the example illustrated in FIG. 8, it is indicated that the decision model DM11 is the model associated with the cluster group identified by the cluster group ID "CL11". For example, it is indicated that the decision model DM11 is the model associated with the cluster group CL11. For example, it is indicated that, regarding the model information related to the decision model DM11, the weight of the feature 1 is "0.5", the weight of the feature 2 is "−0.4", the weight of the feature 3 is "0.2", and the like. For example, if the feature (feature value) of a model is represented by an m-dimensional vector, the number of features is m and the weights of the feature 1 to the feature m are stored.

Furthermore, the information is not limited to that described above and the decision model information storage unit 125 may also store therein various kinds of information in accordance with purposes.

Classification Model Information Storage Unit 126

The classification model information storage unit 126 according to the embodiment stores therein information related to learning. FIG. 9 is a diagram illustrating an example of the classification model information storage unit according to the embodiment. For example, the classification model information storage unit 126 stores therein model information for each user who belongs to each of the clusters. In the example illustrated in, the classification model information storage unit 126 stores therein information (table) for each cluster group, as indicated by a classification model information group 126-1, a classification model information group 126-2, a classification model information group 126-3, and the like. The classification model information group 126-1, the classification model information group 126-2, the classification model information group 126-3, and the like illustrated in FIG. 9 have items, such as "cluster group ID (type ID)", "cluster ID", "target", "model information", and the like.

The "cluster group ID (type ID)" indicates identification information for identifying each cluster group. The "cluster ID" indicates identification information for identifying each of the clusters included in the associated cluster group. The "target" indicates a target (user) belonging to the associated cluster. The "model information" indicates the classification models PM1-1 to PM1-3 associated with each of the targets (users). For example, the "model information" has items, such as the "feature 1" to "feature 3", and the like, in association with the classification models PM1-1 to PM1-3, and the like.

In the example illustrated in FIG. 9, it is indicated that, in the cluster group identified by the cluster group ID "CL11", four clusters, i.e., the A cluster identified by the cluster ID "CL11-1", the B cluster identified by the cluster ID "CL11-2", the C cluster identified by the cluster ID "CL11-3", and the D cluster identified by the cluster ID "CL11-4", are included.

Furthermore, it is indicated that, in the A cluster identified by the cluster ID "CL11-1", the user (user U1) identified by the user ID "U1", the user (user U44) identified by the user ID "U44", and the user (user U189) identified by the user ID "U189" are included in the target.

Furthermore, in the example illustrated in FIG. 9, it is indicated that the classification model PM1-1 is associated with the user U1 included in the A cluster. For example, it is indicated that, regarding the model information related to the classification model PM1-1, the weight of the feature 1 is "0.8", the weight of the feature 2 is "0.5", the weight of the feature 3 is "−1.0", and the like.

Furthermore, in the example illustrated in FIG. 9, it is indicated that the classification model PM1-2 is associated with the user U44 included in the A cluster. For example, it is indicated that, regarding the model information related to the classification model PM1-2, the weight of the feature 1 is "−0.7", the weight of the feature 2 is "0", the weight of the feature 3 is "1.8", and the like.

Furthermore, in the example illustrated in FIG. 9, it is indicated that the classification model PM1-3 is associated with the user U189 included in the A cluster. For example, it is indicated that, regarding the model information related to the classification model PM1-3, the weight of the feature 1 is "1.3", the weight of the feature 2 is "−0.4", the weight of the feature 3 is "−0.2", and the like.

Furthermore, the information is not limited to that described above and the classification model information storage unit 126 may also store therein various kinds of information in accordance with purposes.

Control Unit 130

A description will be given here by referring back to FIG. 3. The control unit 130 is a controller and is implemented by, for example, a central processing unit (CPU), a micro processing unit (MPU), or the like, executing various kinds of programs (corresponding to an example of an authentication program), which are stored in a storage device in the authentication apparatus 100, by using a RAM as a work area. Furthermore, the control unit 130 is a controller and is implemented by, for example, an integrated circuit, such as an application specific integrated circuit (ASIC), a field programmable gate array (FPGA), or the like.

As illustrated in FIG. 3, the control unit 130 includes an acquiring unit 131, a first specifying unit 132, a second specifying unit 133, an authentication unit 134, and a providing unit 135 and implements or executes the function or the operation of the information processing described below. Furthermore, the internal configuration of the control unit 130 is not limited to the configuration illustrated in FIG. 3 and another configuration may also be used as long as the configuration in which the information processing described below is performed.

Acquiring Unit 131

The acquiring unit 131 acquires various kinds of information. For example, the acquiring unit 131 acquires various kinds of information from an external device, such as the terminal device 10. For example, the acquiring unit 131 acquires various kinds of information from the user information storage unit 121, the context information storage unit 122, the cluster group information storage unit 123, the cluster information storage unit 124, the decision model information storage unit 125, the classification model information storage unit 126, and the like. For example, the acquiring unit 131 may also acquire a decision model from an external information processing apparatus and stores the decision model in the decision model information storage unit 125. For example, the acquiring unit 131 may also acquire the decision models DM11 to DM16 or the like associated with the cluster groups CL11 to CL16, respectively, from an external information processing apparatus and store the acquired decision models in the decision model information storage unit 125. For example, the acquiring unit 131 may also acquire a classification model from an external information processing apparatus and store the classification model in the classification model information storage unit 126. For example, the acquiring unit 131 may also acquire the classification model created for each cluster from an external information processing apparatus and stores the classification model in the classification model information storage unit 126. Furthermore, for example, the acquiring unit 131 may also acquire the classification models PM1-1 to PM1-3 or the like created for each user who belongs to a cluster from an external information processing apparatus and stores the acquired classification models in the classification model information storage unit 126.

For example, the acquiring unit 131 acquires various kinds of information related to a user from the terminal device 10. For example, the acquiring unit 131 acquires context information on a target user who becomes the target for authentication. For example, the acquiring unit 131 acquires context information in which information that is used for the authentication apparatus 100 to uniquely specify the user who uses the terminal device 10 is not included.

In the example illustrated in FIG. 1, the acquiring unit 131 acquires context information on a user from the terminal device 10. For example, the acquiring unit 131 acquires context information on a user from the terminal device 10 that is used by an unspecified user. For example, the acquiring unit 131 acquires the context information on the user as indicated in the acquisition context list SD11 illustrated in FIG. 1.

First Specifying Unit 132

The first specifying unit 132 creates various kinds of information. For example, the first specifying unit 132 specifies various kinds of information based on the information stored in the user information storage unit 121, the context information storage unit 122, the cluster group information storage unit 123, the cluster information storage unit 124, the decision model information storage unit 125, the classification model information storage unit 126, or the like.

For example, based on the information related to a plurality of cluster groups in each of which clustering is performed on, based on the type related to an element included in the context information, a candidate user group that becomes a candidate for authentication and based on the context information on the target user, the first specifying unit 132 specifies, in each of the plurality of cluster groups, a belonging cluster that is a cluster to which the target user belongs. For example, based on the context information in which information that is used for the authentication apparatus 100 to uniquely specify a user who uses the terminal device 10 is not included, the first specifying unit 132 specifies, in each of the plurality of cluster groups, a belonging cluster that is a cluster to which the target user belongs. For example, based on the information related to a plurality of cluster groups that are based on the type related to different elements, the first specifying unit 132 specifies, in each of the plurality of cluster groups, a belonging cluster that is a cluster to which the target user belongs.

For example, in accordance with the element associated with each of the cluster groups, based on the plurality of cluster groups in each of which the number of clusters included in each cluster group is determined, the first specifying unit 132 specifies, in each of the plurality of cluster groups, a belonging cluster that is a cluster to which the target user belongs. For example, based on the information related to the plurality of cluster groups that include the cluster group in which clustering is performed on a candidate user group based on the type related to the attribute of the user, the first specifying unit 132 specifies, in each of the plurality of cluster groups, a belonging cluster that is a cluster to which the target user belongs. For example, based on the information related to the plurality of cluster groups that include the cluster group in which clustering is performed on a candidate user group based on the type related to the action history of the user, the first specifying unit 132 specifies, in each of the plurality of cluster groups, a belonging cluster that is a cluster to which the target user belongs. For example, the first specifying unit 132 changes, in accordance with the element associated with each of the cluster groups, the number of clusters in each cluster group.

For example, based on the information related to the plurality of cluster groups that include the cluster group in which clustering is performed on a candidate user group based on the type related to the terminal device used by the user, the first specifying unit 132 specifies, in each of the plurality of cluster groups, a belonging cluster that is a cluster to which the target user belongs. For example, based on the information related to the plurality of cluster groups that include the cluster group in which clustering is performed on a candidate user group based on the type related to a communication environment of the user, the first specifying unit 132 specifies, in each of the plurality of cluster groups, a belonging cluster that is a cluster to which the target user belongs.

In the example illustrated in FIG. 1, based on the context information indicated in the acquisition context list SD11 and based on the decision model list DML, the first specifying unit 132 specifies, in each cluster group, a belonging cluster that is a cluster to which the target user belongs. For example, if the context information is input to the decision model DM11, the first specifying unit 132 specifies, in accordance with the score that is output by the decision model DM11, the belonging cluster, in the cluster group CL11, of the user associated with the context information. For example, if the context information indicated in the acquisition context list SD11 is input to the decision model DM11, the first specifying unit 132 specifies the belonging cluster of the target user in the cluster group CL11 in accordance with the score that is output by the decision model DM11.

In the example illustrated in FIG. 1, based on the context information indicated in the acquisition context list SD11, the first specifying unit 132 determines that the belonging cluster of the target user in the cluster group CL11 is the cluster CL11-1. For example, from among the four clusters of the cluster CL11-1 to the cluster CL11-4 included in the cluster group CL11, the first specifying unit 132 determines that the belonging cluster of the target user is the cluster CL11-1. For example, if the score that is output by the decision model DM11 to which the context information indicated in the acquisition context list SD11 is input is within the range associated with the cluster CL11-1, the first specifying unit 132 determines that the belonging cluster of the target user is the cluster CL11-1.

Furthermore, in the example illustrated in FIG. 1, based on the context information indicated in the acquisition context list SD11, the first specifying unit 132 determines that the belonging cluster of the target user in the cluster group CL12 is the cluster CL12-23. For example, from among the 50 clusters of the cluster CL12-1 to the cluster CL12-50 included in the cluster group CL12, the first specifying unit 132 determines that the belonging cluster of the target user is the cluster CL12-23. For example, if the score that is output by the decision model DM12 to which the context information indicated in the acquisition context list SD11 is input is within the range associated with the cluster CL12-23, the first specifying unit 132 determines that the belonging cluster of the target user is the cluster CL12-23.

Furthermore, in the example illustrated in FIG. 1, based on the context information indicated in the acquisition context list SD11, the first specifying unit 132 determines that the belonging cluster of the target user in the cluster group CL13 is the cluster CL13-4. For example, from among the 10 clusters of the cluster CL13-1 to the cluster CL13-10 included in the cluster group CL13, the first specifying unit 132 determines that the belonging cluster of the target user is the cluster CL13-4. For example, if the score that is output by the decision model DM13 to which the context information indicated in the acquisition context list SD11 is within the range associated with the cluster CL13-4, the first specifying unit 132 determines that the belonging cluster of the target user is the cluster CL13-4.

Second Specifying Unit 133

The second specifying unit 133 specifies various kinds of information. For example, the second specifying unit 133 specifies various kinds of information based on the information stored in the user information storage unit 121, the context information storage unit 122, the cluster group information storage unit 123, the cluster information storage unit 124, the decision model information storage unit 125, the classification model information storage unit 126, or the like.

For example, based on the classification model that is used to specify a predetermined candidate user in a partial candidate user group that belongs to the belonging cluster specified by the first specifying unit 132 and based on the context information on the target user, the second specifying unit 133 specifies, for each of the belonging clusters associated with each of the plurality of cluster groups, a candidate user, in the partial candidate user group that belongs to the subject belonging cluster, who satisfies a predetermined condition. For example, based on the context information in which information that is used for the authentication apparatus 100 to uniquely specify a user who uses the terminal device 10 is not included, the second specifying unit 133 specifies, for each of the belonging clusters associated with each of the plurality of cluster groups, a candidate user, in the partial candidate user group that belongs to the subject belonging cluster, who satisfies a predetermined condition.

For example, the second specifying unit 133 specifies the candidate user, who satisfies a predetermined condition of a classification score that is output by the classification model associated with the belonging cluster in one of the cluster groups, as a candidate user associated with the one of the cluster groups. For example, the second specifying unit 133 specifies a plurality of candidate users, who satisfy a predetermined condition of a classification score that is output by the classification model associated with the belonging cluster in one of the cluster groups, as candidate users associated with the one of the cluster groups. For example, in accordance with the number of the plurality of cluster groups, the second specifying unit 133 changes the number of candidate users to be specified in each cluster group.

For example, based on the classification model that includes a plurality of judgment models associated with each of the users in the partial candidate user group that belongs to the belonging cluster that is specified by the first specifying unit 132, the second specifying unit 133 specifies, for each of the belonging clusters associated with each of the plurality of cluster groups, which of the candidate users is the target user. For example, based on the classification model that is a multi-class classification model of a partial candidate user group that belongs to the belonging cluster specified by the first specifying unit 132, the second specifying unit 133 specifies, for each of the belonging clusters associated with each of the plurality of cluster groups, which of the candidate users is the target user.

In the example illustrated in FIG. 1, the second specifying unit 133 specifies the candidate user who satisfies a predetermined condition and who is included in the belonging user group (partial candidate user group) that belongs to each of the specified belonging clusters. For example, based on the context information indicated in the acquisition context list SD11 and based on the classification model list PML, the second specifying unit 133 specifies a candidate user related to the target user in the partial candidate user group included in each of the belonging clusters.

In the example illustrated in FIG. 1, based on the context information indicated in the acquisition context list SD11 and based on the classification model PM1-1 to the classification model PM1-3 and the like, the second specifying unit 133 specifies the score of each of the users included in the candidate user group of the cluster CL11-1. For example, as indicated in the candidate user group information UL11, the second specifying unit 133 specifies the scores of the user U1, the user U44, the user U189, and the like included in the candidate user group of the cluster CL11-1. For example, based on the context information indicated in the acquisition context list SD11 and based on the classification model PM1-1, the second specifying unit 133 determines that the score of the user U1 in the cluster CL11-1 is "0.6". For example, based on the context information indicated in the acquisition context list SD11 and based on the classification model PM1-2, the second specifying unit 133 determines that the score of the user U44 in the cluster CL11-1 is "1.1".

Furthermore, in the example illustrated in FIG. 1, based on the context information indicated in the acquisition context list SD11 and based on the classification model PM2-1 to the classification model PM2-3 and the like, the second specifying unit 133 specifies the score of each of the users included in the candidate user group of the cluster CL12-23. For example, as indicated by the candidate user group information UL12, the second specifying unit 133 specifies the scores of the user U44, the user U1221, the user U8902, and the like included in the candidate user group of the cluster CL12-23.

Furthermore, in the example illustrated in FIG. 1, based on the context information indicated in the acquisition context list SD11 and based on the classification model PM3-1 to the classification model PM3-3 and the like, the second specifying unit 133 specifies the score of each of the users included in the candidate user group of the cluster CL13-4. For example, as indicated by the candidate user group information UL13, the second specifying unit 133 specifies the scores of the user U1, the user U432, the user U5143, and the like included in the candidate user group of the cluster CL13-4.

In the example illustrated in FIG. 1, the second specifying unit 133 specifies a candidate user in each cluster group based on the score of each of the candidate user groups. For example, from among the users included in each of the candidate user groups in each cluster group, the second specifying unit 133 determines that the user with the maximum score is a candidate user. For example, based on the score of each of the candidate users indicated in the candidate user group information UL11, the second specifying unit 133 specifies the candidate user in the cluster group CL11. For example, as indicated by the candidate user specific information CU11, the second specifying unit 133 determines that the candidate user in the cluster group CL11 is the user U44 who has the maximum score of "1.1".

For example, based on the score of each of the candidate users indicated by the candidate user group information UL12, the second specifying unit 133 specifies a candidate user in the cluster group CL12. For example, as indicated by the candidate user specific information CU12, the second specifying unit 133 determines that the candidate user in the cluster group CL12 is the user U44 who has the maximum score of "0.7". For example, based on the score of each of the candidate user indicated by the candidate user group information UL13, the second specifying unit 133 specifies the candidate user in the cluster group CL13. For example, as indicated by the candidate user specific information CU13, the second specifying unit 133 in the authentication apparatus 100 determines that the candidate user in the cluster group CL13 is the user U1 who has the maximum score of "0.6".

In the example illustrated in FIG. 1, the second specifying unit 133 aggregates the information related to the candidate user specified in each cluster group. For example, as indicated in the aggregate information VR11, the second specifying unit 133 specifies an aggregate score based on the information related to the candidate user indicated by the candidate user specific information CU11 to the candidate user specific information CU13. For example, the second specifying unit 133 counts the number of times each of the users appear in the candidate user specific information CU11 to the candidate user specific information CU13 and then sets the counted number of times of the appearances to the aggregate score. For example, the second specifying unit 133 determines that the aggregate score of the user U44 who has appeared five times as a candidate user in each cluster group is "5". For example, the second specifying unit 133 determines that the aggregate score of the user U78 who has appeared three times as a candidate user in each cluster group is "3". For example, the second specifying unit 133 determines that the aggregate score of the user U1 who has appeared once as a candidate user in each cluster group is "1".

Authentication Unit 134

The authentication unit 134 authenticates various kinds of information. For example, the authentication unit 134 authenticates a user. For example, the authentication unit 134 authenticates the user who uses the terminal device 10. For example, the authentication unit 134 authenticates a user based on the information stored in the user information storage unit 121, the context information storage unit 122, the cluster group information storage unit 123, the cluster information storage unit 124, the decision model information storage unit 125, the classification model information storage unit 126, or the like. For example, the authentication unit 134 authenticates a user based on the context information in which information that is used for the authentication apparatus 100 to uniquely specify a user who uses the terminal device 10 is not included.

For example, based on the information related to the candidate users associated with each of the plurality of cluster groups specified by the second specifying unit 133, the authentication unit 134 authenticates the target user. For example, the authentication unit 134 authenticates the target user based on the frequency of appearance of each of the candidate users regarding the candidate users associated with each of the plurality of cluster groups. For example, the authentication unit 134 authenticates the target user as the most frequently appearing candidate user from among the candidate users associated with each of the plurality of cluster groups. For example, the authentication unit 134 authenticates the target user based on a predetermined score that is associated with the candidate users associated with each of the plurality of cluster groups. For example, the authentication unit 134 authenticates the target user as the candidate user who has the maximum predetermined score from among the candidate users who are associated with each of the plurality of cluster groups.

For example, the authentication unit 134 authenticates the target user based on the information related to the candidate users associated with each of the plurality of cluster groups. In the example illustrated in FIG. 1, the authentication unit 134 recognizes that, as authentication, the target user is the user U44 who is the first ranked candidate user from among the candidate users indicated in the aggregate information VR11. Namely, the authentication unit 134 recognizes that, as authentication, the target user is the user U44 who has the maximum aggregate score from among the candidate users indicated in the aggregate information VR11.

Providing Unit 135

The providing unit 135 provides various kinds of information to the terminal device 10. For example, the providing unit 135 provides various services to the users. For example, the providing unit 135 provides content to the terminal device 10. For example, the providing unit 135 provides various services to the user authenticated by the authentication unit 134. Furthermore, for example, the providing unit 135 provides content to the terminal device 10 that is used by the user authenticated by the authentication unit 134.

Furthermore, the providing unit 135 provides various services associated with the user authenticated by the authentication unit 134. For example, the providing unit 135 provides content to the terminal device 10 used by the user authenticated by the authentication unit 134.

In the example illustrated in FIG. 1, an authentication result is reported to the terminal device 10. For example, the providing unit 135 in the authentication apparatus 100 notifies the terminal device 10 of the authentication result indicating that the user U44 has been authenticated.

3. Flow of the Authentication Process

Figure 10:
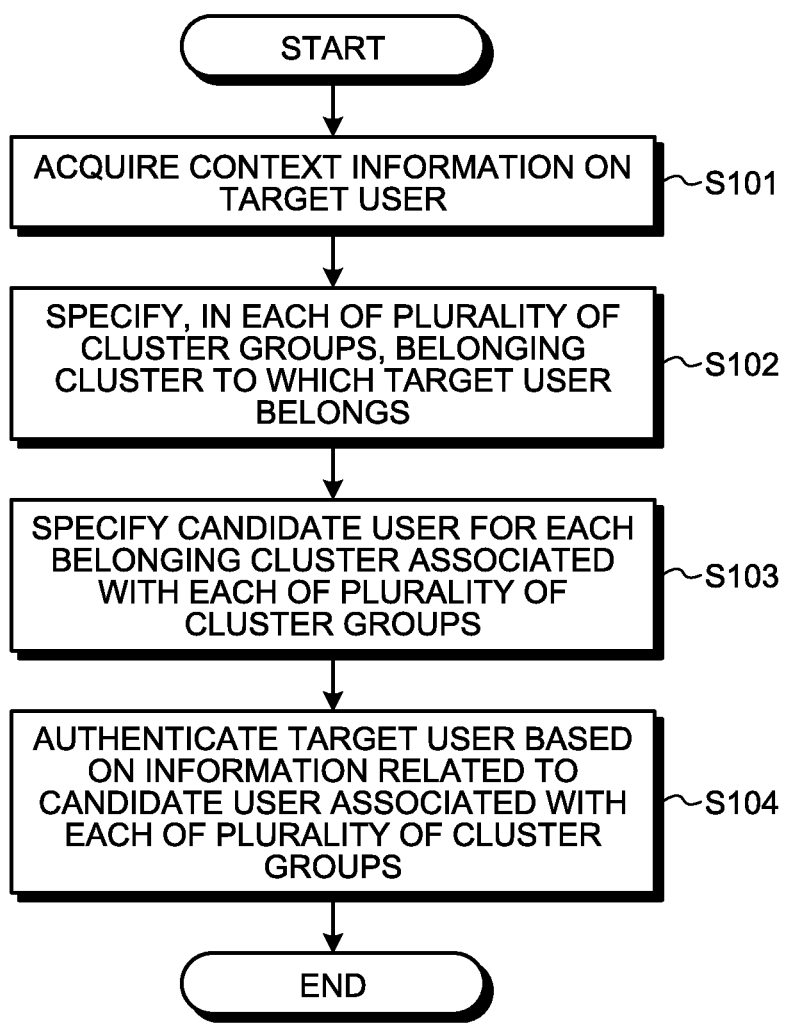
FIG. 10 is a flowchart illustrating an example of the authentication process according to the embodiment.

In the following, the authentication process performed by the authentication system 1 according to the embodiment will be described with reference to FIG. 10. FIG. 10 is a flowchart illustrating an example of the authentication process according to the embodiment.

As illustrated in FIG. 10, the authentication apparatus 100 acquires the context information on a target user (Step S101). For example, the authentication apparatus 100 acquires the context information on the user from the terminal device 10 that is used by the user. In the example illustrated in FIG. 1, the authentication apparatus 100 acquires the context information on the user as indicated in the acquisition context list SD11 illustrated in FIG. 1.

Then, the authentication apparatus 100 specifies, in each of the plurality of cluster groups, the belonging cluster to which the target user belongs (Step S102). In the example illustrated in FIG. 1, based on the context information indicated in the acquisition context list SD11, the authentication apparatus 100 determines that the belonging cluster of the target user in the cluster group CL11 is the cluster CL11-1. In the example illustrated in FIG. 1, based on the context information indicated in the acquisition context list SD11, the authentication apparatus 100 determines that the belonging cluster of the target user in the cluster group CL12 is the cluster CL12-23. In the example illustrated in FIG. 1, based on the context information indicated in the acquisition context list SD11, the authentication apparatus 100 determines that the belonging cluster of the target user in the cluster group CL13 is the cluster CL13-4.

Furthermore, the authentication apparatus 100 specifies the candidate user for each belonging cluster associated with each of the plurality of cluster groups (Step S103). In the example illustrated in FIG. 1, as indicated in the candidate user specific information CU11, the authentication apparatus 100 determines that the candidate user in the cluster group CL11 is the user U44 who has the maximum score of "1.1". In the example illustrated in FIG. 1, as indicated in the candidate user specific information CU12, the authentication apparatus 100 determines that the candidate user in the cluster group CL12 is the user U44 who has the maximum score of "0.7". In the example illustrated in FIG. 1, as indicated in the candidate user specific information CU13, the authentication apparatus 100 determines that the candidate user in the cluster group CL13 is the user U1 who has the maximum score of "0.6".

Then, the authentication apparatus 100 authenticates the target users based on the information related to the candidate users associated with each of the plurality of cluster groups (Step S104). In the example illustrated in FIG. 1, the authentication apparatus 100 recognizes that, as authentication, the target user is the user U44 who is the first ranked candidate user from among the candidate users indicated in the aggregate information VR11. Namely, the authentication apparatus 100 recognizes that, as authentication, the target user is the user U44 who has the maximum aggregate score from among the candidate users indicated in the aggregate information VR11.

4. Specifying a Plurality of Candidate Users

Figure 11:
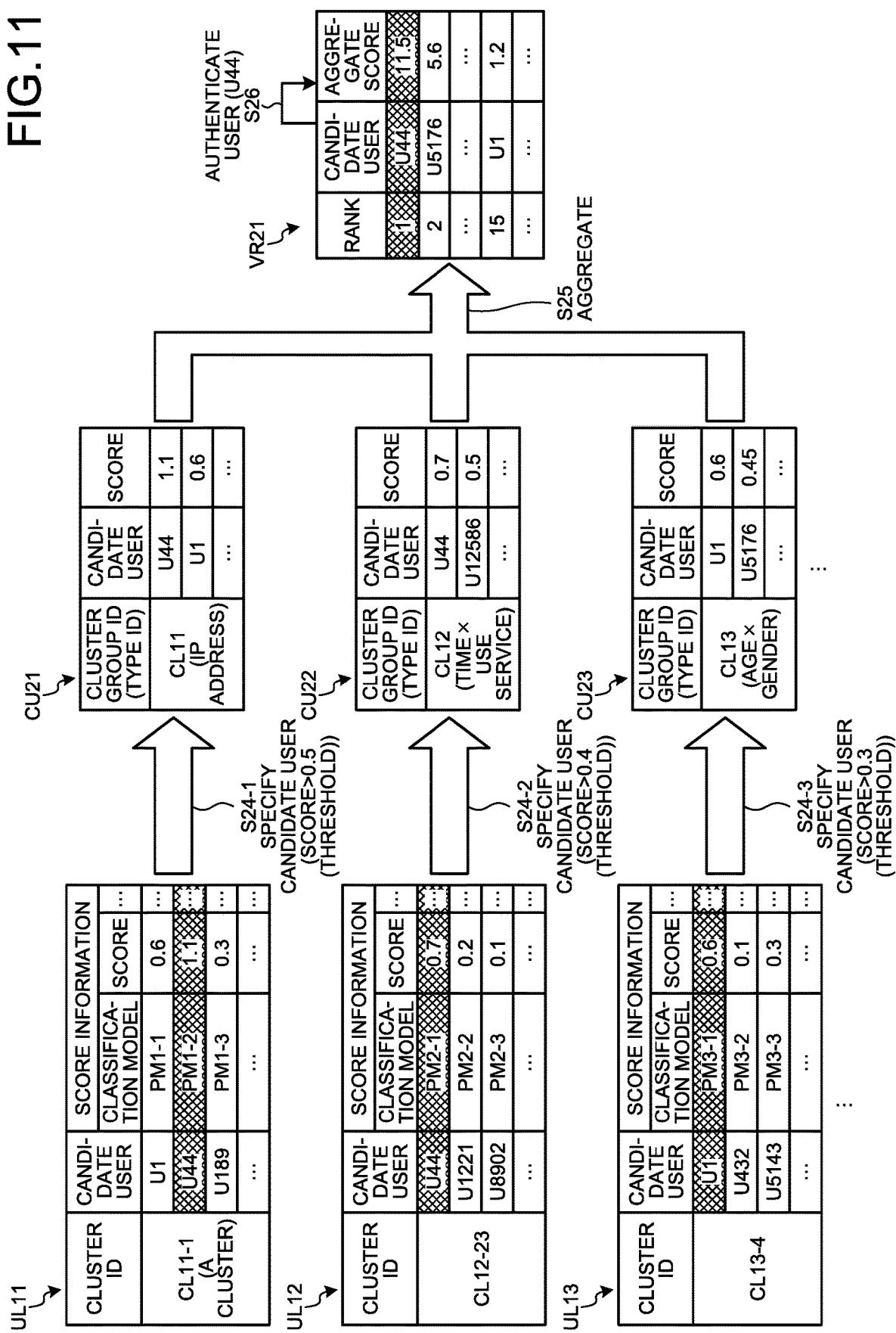
FIG. 11 is a diagram illustrating an example of the authentication process according to the embodiment.

In the example illustrated in FIG. 1, a case in which only a single candidate user is specified from each cluster group has been described; however, the authentication apparatus 100 may also specify a plurality of candidate users from each cluster group. This point will be described with reference to FIG. 11. FIG. 11 is a diagram illustrating an example of the authentication process according to the embodiment. The example illustrated in FIG. 11 indicates a case in which the authentication apparatus 100 specifies a candidate user from each cluster group by using a threshold. Furthermore, it is assumed that the same processes as those performed at Step S11 to Step S13-3 illustrated in FIG. 1 are performed.

In the example illustrated in FIG. 11, the authentication apparatus 100 specifies a candidate user in the cluster group CL11 based on the score of each of the candidate users indicated in the candidate user group information UL11 (Step S24-1). Specifically, regarding each of the candidate users indicated by the candidate user group information UL11, the authentication apparatus 100 specifies, as the candidate user in the cluster group CL11, the users who have the score that is greater than a predetermined threshold "0.5". Consequently, in the example illustrated in FIG. 11, as indicated in the candidate user specific information CU21, the authentication apparatus 100 specifies, as the candidate users in the cluster group CL11, the user U44 who has the score "1.1" that is greater than a threshold "0.5" and the user U1 who has the score "0.6" that is greater than the threshold "0.5".

Furthermore, in the example illustrated in FIG. 11, the authentication apparatus 100 specifies the candidate user in the cluster group CL12 based on the score of each of the candidate users indicated in the candidate user group information UL12 (Step S24-2). Specifically, regarding each of the candidate users indicated in the candidate user group information UL12, the authentication apparatus 100 specifies, as the candidate users in the cluster group CL12, the users who have the score that is greater than a predetermined threshold "0.4". Consequently, in the example illustrated in FIG. 11, as indicated by the candidate user specific information CU22, the authentication apparatus 100 specifies, as the candidate users in the cluster group CL12, the user U44 who has the score "0.7" that is greater than a threshold "0.4" and a user U12586 who has the score "0.5" that is greater than the threshold "0.4". In this way, the threshold of each cluster group may also be different.

Furthermore, in the example illustrated in FIG. 11, the authentication apparatus 100 specifies the candidate users in the cluster group CL13 based on the score of each of the candidate users indicated in the candidate user group information UL13 (Step S24-3). Specifically, regarding each of the candidate users indicated in the candidate user group information UL13, the authentication apparatus 100 specifies, as the candidate users in the cluster group CL13, the users who have the score that is greater than a predetermined threshold "0.3". Consequently, in the example illustrated in FIG. 11, as indicated in the candidate user specific information CU23, the authentication apparatus 100 specifies, as the candidate users in the cluster group CL13, the user U1 who has the score "0.6" that is greater than a threshold "0.3" and a user U5176 who has the score "0.45" that is greater than the threshold "0.3".

Then, the authentication apparatus 100 aggregates the information related to the candidate users specified in each cluster group (Step S25). For example, as indicated in the aggregate information VR21, the authentication apparatus 100 specifies an aggregate score based on the information related to the candidate users indicated in the candidate user specific information CU21 to the candidate user specific information CU23. For example, by adding the scores of the users specified as the candidate users in each cluster group, the authentication apparatus 100 specifies the aggregate score of each of the users. In the example illustrated in FIG. 11, by adding the scores of the user U44 included in the candidate user in each cluster group, the authentication apparatus 100 determines that the aggregate score is "11.5". For example, by adding the scores of the user U5176 included in the candidate users in the cluster group, the authentication apparatus 100 determines that the aggregate score is "5.6". For example, by adding the scores of the user U1 included in the candidate users in the cluster group, the authentication apparatus 100 determines that the aggregate score is "1.2".

Then, the authentication apparatus 100 authenticates the target user based on the information related to the candidate users associated with each of the plurality of cluster groups (Step S26). In the example illustrated in FIG. 11, the authentication apparatus 100 recognizes that, as authentication, the target user is the user U44 who is the first ranked candidate user from among the candidate users indicated in the aggregate information VR21. Namely, the authentication apparatus 100 recognizes that, as authentication, the target user is the user U44 who has the maximum aggregate score from among the candidate users indicated in the aggregate information VR21. Furthermore, in accordance with the number of the plurality of cluster groups, the authentication apparatus 100 may also change the number of candidate users to be specified in each cluster group. For example, if the number of the plurality of cluster groups is 100, the authentication apparatus 100 may also set the number of candidate users to be specified in each of the plurality of cluster groups to "2". For example, if the number of the plurality of cluster groups is 10, the authentication apparatus 100 may also set the number of candidate users to be specified in each of the plurality of cluster groups to "20". For example, if the number of the plurality of cluster groups is 200, the authentication apparatus 100 may also set the number of candidate users to be specified in each of the plurality of cluster groups to "1".

5. Reliability of Each Cluster Group

Figure 12:
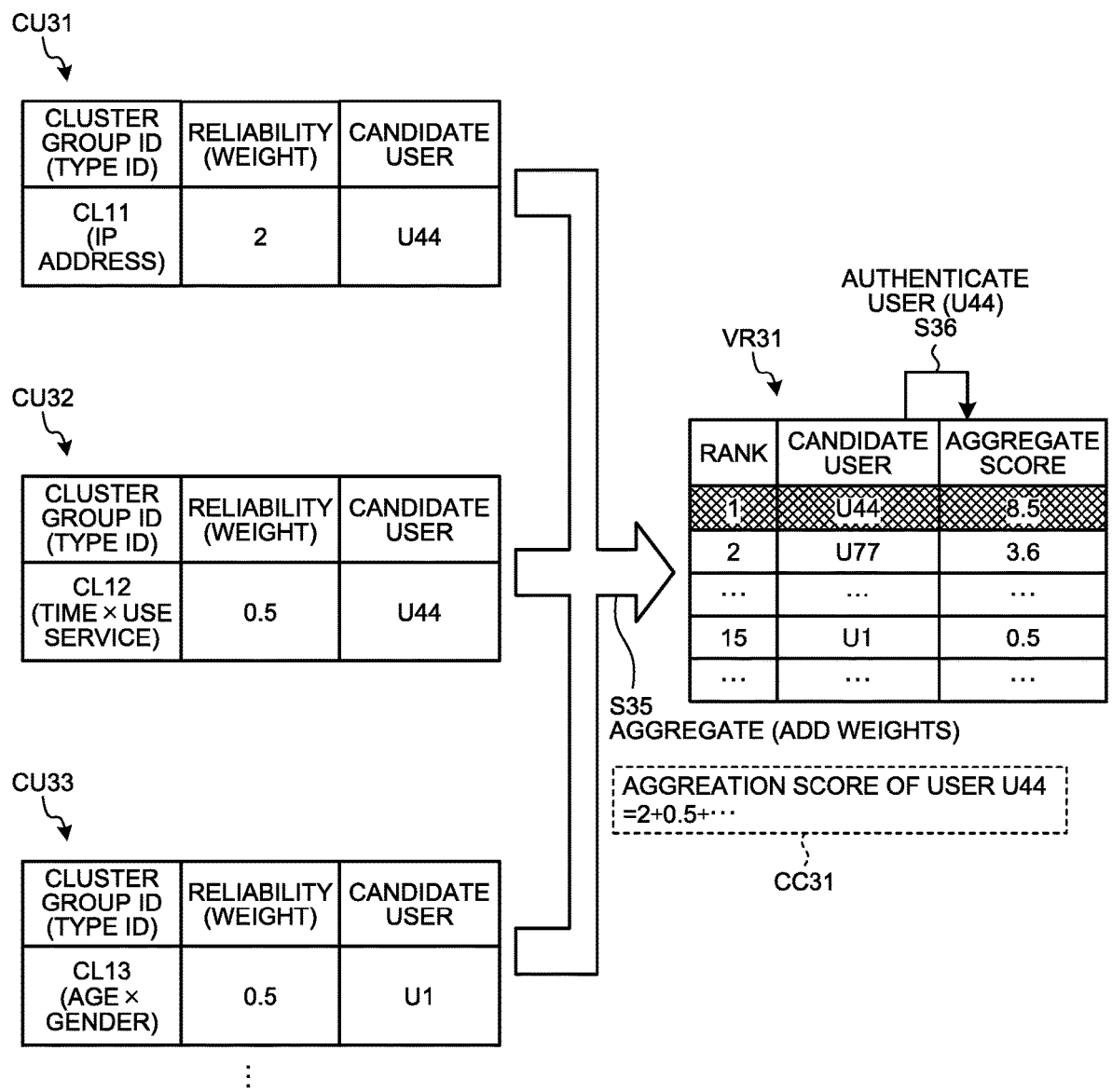
FIG. 12 is a diagram illustrating an example of the authentication process according to the embodiment.

In the example illustrated in FIG. 1, a case in which the number of appearances as a candidate user in each cluster group is counted has been described; however, the authentication apparatus 100 may also specify an aggregate score by using weighting related to each cluster group. This point will be described with reference to FIG. 12. FIG. 12 is a diagram illustrating an example of an authentication process according to the embodiment. The example illustrated in FIG. 12 indicates a case in which the authentication apparatus 100 uses the reliability of each of the cluster group as the weight.

The reliability mentioned here may also use the user specified as a candidate user in each cluster group as an index obtained based on the level of possibility of a target user. For example, if the user specified as a candidate user in the subject cluster group is highly likely to be a target user (for example, 80% or more), it may also be possible to set the reliability of the subject cluster group high, i.e., increase the weight (for example, 2.5 or the like). For example, if the user specified as a candidate user in the subject cluster group is less likely to be a target user (for example, less than 10%), it may also be possible to set the reliability of the subject cluster group low, i.e., decrease the weight (for example, 0.1 or the like). Furthermore, it is assumed that the same processes as those performed at Step S11 to Step S14-3 illustrated in FIG. 1 are performed.

In the example illustrated in FIG. 12, it is assumed that, as indicated in the candidate user specific information CU31, the reliability (weight) of the cluster group CL11 is "2". Furthermore, in the example illustrated in FIG. 12, it is assumed that, as indicated by the candidate user specific information CU32, the reliability (weight) of the cluster group CL12 is "0.5". In the example illustrated in FIG. 12, it is assumed that, as indicated by the candidate user specific information CU33, the reliability (weight) of the cluster group CL13 is "0.5". Namely, in the example illustrated in FIG. 12, it is assumed that the reliability of the cluster group CL11 is high and the reliability of each of the cluster group CL12 and the cluster group CL13 is low.

Then, the authentication apparatus 100 aggregates the information related to the candidate user specified in each cluster group (Step S35). For example, as indicated in the aggregate information VR31, the authentication apparatus 100 specifies an aggregate score based on the information related to the candidate users indicated in the candidate user specific information CU11 to the candidate user specific information CU13. For example, by adding the weight associated with each cluster group in which each user is included as a candidate user, the authentication apparatus 100 specifies the aggregate score of each user. In the example illustrated in FIG. 12, as indicated by an equation CC31, by adding the weight of each cluster group in which the user U44 is included as a candidate user, the authentication apparatus 100 determines that the aggregate score is "8.5". Furthermore, in the example illustrated in FIG. 12, by adding the weight of each cluster group in which a user U77 is included as a candidate user, the authentication apparatus 100 determines that the aggregate score is "3.6". Furthermore, in the example illustrated in FIG. 12, by adding the weight of each cluster group in which the user U1 is included as a candidate user, the authentication apparatus 100 determines that the aggregate score is "0.5".

Then, the authentication apparatus 100 authenticates the target user based on the information related to the candidate users associated with each of the plurality of the cluster groups (Step S36). In the example illustrated in FIG. 12, the authentication apparatus 100 recognizes that, as authentication, the target user is the user U44 who is the first ranked candidate user from among the candidate users indicated in the aggregate information VR31. Namely, the authentication apparatus 100 recognizes that, as authentication, the target user is the user U44 who has the maximum aggregate score from among the candidate users indicated in the aggregate information VR31.

6. Effects

As described above, the authentication apparatus 100 according to the embodiment includes the acquiring unit 131, the first specifying unit 132, the second specifying unit 133, and the authentication unit 134. The acquiring unit 131 acquires context information on a target user who becomes a target for authentication. The first specifying unit 132 specifies, based on information related to a plurality of cluster groups in each of which clustering is performed on, based on the type related to an element included in the context information, a candidate user group that becomes a candidate for authentication and based on the context information on the target user, in each of the plurality of cluster groups, a belonging cluster that is a cluster to which the target user belongs. The second specifying unit 133 specifies, based on a classification model that is used to specify a predetermined candidate user, in a partial candidate user group that belongs to the belonging cluster specified by the first specifying unit 132 and based on the context information on the target user, for each of the belonging clusters associated with each of the plurality of cluster groups, a candidate user, in the partial candidate user group that belongs to the subject belonging cluster, who satisfies a predetermined condition. The authentication unit 134 authenticates the target user based on information related to the candidate user who is associated with each of the plurality of cluster groups and who is specified by the second specifying unit 133.

Consequently, the authentication apparatus 100 according to the embodiment specifies, in each of the plurality of cluster groups, the belonging cluster that is the cluster to which the target user belongs; specifies, based on the classification model and the context information on the target user, in the partial candidate user group that belongs to the subject belonging cluster, a candidate user who satisfies a predetermined condition, for each of the belonging clusters associated with each of the plurality of cluster groups; and authenticates the target user based on the information related to the candidate user who is associated with each of the plurality of cluster groups, whereby the authentication apparatus 100 can appropriately authenticate a user in accordance with a context of the user.

Furthermore, in the authentication apparatus 100 according to the embodiment, the first specifying unit 132 specifies, based on the information related to the plurality of the cluster groups each of which is based on the type related to different elements, in each of the plurality of cluster groups, the belonging cluster that is the cluster to which the target user belongs.

Consequently, the authentication apparatus 100 according to the embodiment can appropriately authenticate a user in accordance with a context of the user based on the information related to the plurality of the cluster groups each of which is based on the type related to different elements.

Furthermore, in the authentication apparatus 100 according to the embodiment, the first specifying unit 132 specifies, in accordance with the element associated with each of the cluster groups, based on the plurality of the cluster groups in each of which the number of clusters included in each of the cluster groups is determined, in each of the plurality of cluster groups, the belonging cluster that is the cluster to which the target user belongs.

Consequently, the authentication apparatus 100 according to the embodiment can appropriately authenticate a user in accordance with a context of the user based on the plurality of the cluster groups in each of which the number of clusters included in each of the cluster groups is determined in accordance with the element associated with each of the cluster groups.

Furthermore, in the authentication apparatus 100 according to the embodiment, the first specifying unit 132 changes, in accordance with the element associated with each of the cluster groups, the number of clusters in each of the cluster groups.

Consequently, the authentication apparatus 100 according to the embodiment can appropriately authenticate a user in accordance with a context of the user by changing in accordance with the element associated with each cluster group, the number of clusters in each cluster group.

Furthermore, in the authentication apparatus 100 according to the embodiment, the second specifying unit 133 specifies a candidate user, who satisfies a predetermined condition of a classification score that is output by the classification model associated with a belonging cluster in one of the cluster groups, as a candidate user associated with the one of the cluster groups.

Consequently, the authentication apparatus 100 according to the embodiment can appropriately authenticate a user in accordance with a context of the user by specifying a candidate user, who satisfies a predetermined condition of a classification score that is output by the classification model associated with a belonging cluster in one of the cluster groups, as a candidate user associated with the one of the cluster groups.

Furthermore, in the authentication apparatus 100 according to the embodiment, the second specifying unit 133 specifies a plurality of candidate users, who satisfy a predetermined condition of a classification score that is output by the classification model associated with the belonging cluster in one of the cluster groups, as candidate users associated with the one of the cluster groups.

Consequently, the authentication apparatus 100 according to the embodiment can appropriately authenticate a user in accordance with a context of the user by specifying a plurality of candidate users, who satisfy a predetermined condition of a classification score that is output by the classification model associated with the belonging cluster in one of the cluster groups, as candidate users associated with the one of the cluster groups.

Furthermore, in the authentication apparatus 100 according to the embodiment, the second specifying unit 133 changes, in accordance with the number of the plurality of the cluster groups, the number of the candidate users to be specified in each of the cluster groups.

Consequently, the authentication apparatus 100 according to the embodiment can appropriately authenticate a user in accordance with a context of the user by changing, in accordance with the number of the plurality of the cluster groups, the number of the candidate users to be specified in each of the cluster groups.

Furthermore, in the authentication apparatus 100 according to the embodiment, the authentication unit 134 authenticates the target user based on the frequency of appearance of each of the candidate users from among the candidate users associated with each of the plurality of cluster groups.

Consequently, the authentication apparatus 100 according to the embodiment can appropriately authenticate a user in accordance with a context of the user by authenticating the target user based on the frequency of appearance of each of the candidate users from among the candidate users associated with each of the plurality of cluster groups.

Furthermore, in the authentication apparatus 100 according to the embodiment, the authentication unit 134 authenticates the target user based on a predetermined score that is associated with the candidate user associated with each of the plurality of cluster groups.

Consequently, the authentication apparatus 100 according to the embodiment can appropriately authenticate a user in accordance with a context of the user by authenticating the target user based on a predetermined score that is associated with the candidate user associated with each of the plurality of cluster groups.

Furthermore, in the authentication apparatus 100 according to the embodiment, the authentication unit 134 authenticates the target user as a candidate user who has the maximum predetermined score from among the candidate users who are associated with each of the plurality of the cluster groups.

Consequently, the authentication apparatus 100 according to the embodiment can appropriately authenticate a user in accordance with a context of the user by authenticating the target user as a candidate user who has the maximum predetermined score from among the candidate users who are associated with each of the plurality of the cluster groups.

Furthermore, in the authentication apparatus 100 according to the embodiment, the authentication unit 134 specifies, based on the information related to the plurality of the cluster groups that include the cluster group in which clustering is performed on the candidate user group based on the type related to an attribute of a user, in each of the plurality of cluster groups, the belonging cluster that is the cluster to which the target user belongs.

Consequently, the authentication apparatus 100 according to the embodiment can appropriately authenticate a user in accordance with a context of the user based on the information related to the plurality of the cluster groups that include the cluster group in which clustering is performed on the candidate user group based on the type related to the attribute of the user.

Furthermore, in the authentication apparatus 100 according to the embodiment, the authentication unit 134 specifies, based on the information related to the plurality of the cluster groups that include the cluster group in which clustering is performed on the candidate user group based on the type related to an action history of the user, in each of the plurality of cluster groups, the belonging cluster that is the cluster to which the target user belongs.

Consequently, the authentication apparatus 100 according to the embodiment can appropriately authenticate a user in accordance with a context of the user based on the information related to the plurality of the cluster groups that include the cluster group in which clustering is performed on the candidate user group based on the type related to an action history of the user.

Furthermore, in the authentication apparatus 100 according to the embodiment, the authentication unit 134 specifies, based on the information related to the plurality of the cluster groups that include the cluster group in which clustering is performed on the candidate user group based on the type related to a terminal device used by the user, in each of the plurality of cluster groups, the belonging cluster that is the cluster to which the target user belongs.

Consequently, the authentication apparatus 100 according to the embodiment can appropriately authenticate a user in accordance with a context of the user based on the information related to the plurality of the cluster groups that include the cluster group in which clustering is performed on the candidate user group based on the type related to a terminal device used by the user.

Furthermore, in the authentication apparatus 100 according to the embodiment, the authentication unit 134 specifies, based on the information related to the plurality of the cluster groups that include the cluster group in which clustering is performed on the candidate user group based on the type related to a communication environment of the user, in each of the plurality of cluster groups, the belonging cluster that is the cluster to which the target user belongs.

Consequently, the authentication apparatus 100 according to the embodiment can appropriately authenticate a user in accordance with a context of the user based on the information related to the plurality of the cluster groups that include the cluster group in which clustering is performed on the candidate user group based on the type related to a communication environment of the user.

Furthermore, in the authentication apparatus 100 according to the embodiment, the second specifying unit 133 specifies, based on the classification model that includes a plurality of judgment models associated with each of the users in the partial candidate user group that belongs to the belonging cluster specified by the first specifying unit 132, for each of the belonging clusters associated with each of the plurality of the cluster groups, which of the candidate users is the target user.

Consequently, the authentication apparatus 100 according to the embodiment can appropriately authenticate a user in accordance with a context of the user based on the classification model that includes a plurality of judgment models associated with each of the users in the partial candidate user group that belongs to the belonging cluster.

Furthermore, in the authentication apparatus 100 according to the embodiment, the second specifying unit 133 specifies, based on the classification model that is a multi-class classification model of a partial candidate user group that belongs to the belonging cluster specified by the first specifying unit 132, for each of the belonging clusters associated with each of the plurality of the cluster groups, which of the candidate users is the target user.

Consequently, the authentication apparatus 100 according to the embodiment can appropriately authenticate a user in accordance with a context of the user based on the classification model that is a multi-class classification model of a partial candidate user group that belongs to the belonging cluster.

7. Hardware Configuration

Figure 13:
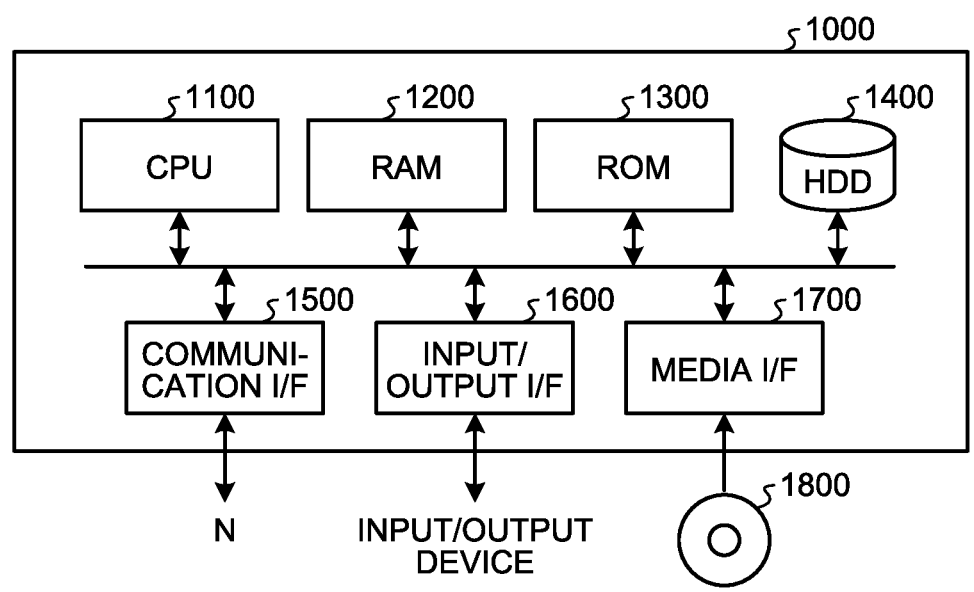
FIG. 13 is a hardware configuration diagram illustrating an example of a computer that implements the authentication apparatus.

The authentication apparatus 100 according to the embodiment described above is implemented by a computer 1000 having the configuration illustrated in for example, FIG. 13. FIG. 13 is a hardware configuration diagram illustrating an example of the computer that implements the authentication apparatus. The computer 1000 includes a CPU 1100, a RAM 1200, a ROM 1300, an HDD 1400, a communication interface (I/F) 1500, an input/output interface (I/F) 1600, and a media interface (I/F) 1700.

The CPU 1100 operates based on a program stored in the ROM 1300 or the HDD 1400 and controls each of the units. The ROM 1300 stores therein a boot program that is executed by the CPU 1100 when the computer 1000 is started up, a program that depends on hardware of the computer 1000, or the like.

The HDD 1400 stores therein a program executed by the CPU 1100, data used by the program, or the like. The communication interface 1500 receives data from other devices via the network N (the network 2 in FIG. 2), sends the data to the CPU 1100, and sends the data collected by the CPU 1100 to other devices via the network N.

The CPU 1100 controls an output device, such as a display or a printer, or an input device, such as a keyboard or a mouse, via the input/output interface 1600. The CPU 1100 acquires data from the input device via the input/output interface 1600. Furthermore, the CPU 1100 outputs the collected data to the output device via the input/output interface 1600.

The media interface 1700 reads a program or data stored in a recording medium 1800 and provides the program or the data to the CPU 1100 via the RAM 1200. The CPU 1100 loads the program from the recording medium 1800 into the RAM 1200 via the media interface 1700 and executes the loaded program. The recording medium 1800 is, for example, an optical recording medium, such as a digital versatile disc (DVD) or a phase change rewritable disk (PD), a magneto optical recording medium, such as a magneto-optical disk (MO), a tape medium, a magnetic recording medium, a semiconductor memory, or the like.

For example, when the computer 1000 functions as the authentication apparatus 100 according to the embodiment, the CPU 1100 in the computer 1000 implements the functions of the control unit 130 by executing a program loaded into the RAM 1200. The CPU 1100 in the computer 1000 reads the program from the recording medium 1800 and executes the program. For another example, the program may also be acquired from other devices via the network N.

In the above, embodiments of the present invention have been described in detail based on the drawings; however the embodiments are described only by way of an example. In addition to the embodiments described in disclosure of invention, the present invention can be implemented in a mode in which various modifications and changes are made in accordance with the knowledge of those skilled in the art.

8. Others

Of the processes described in the embodiment, the whole or a part of the processes that are mentioned as being automatically performed can also be manually performed, or the whole or a part of the processes that are mentioned as being manually performed can also be automatically performed using known methods. Furthermore, the flow of the processes, the specific names, and the information containing various kinds of data or parameters indicated in the above specification and drawings can be arbitrarily changed unless otherwise stated. For example, the various kinds of information illustrated in each of the drawings are not limited to the information illustrated in the drawings.

The components of each unit illustrated in the drawings are only for conceptually illustrating the functions thereof and are not always physically configured as illustrated in the drawings. In other words, the specific shape of a separate or integrated device is not limited to the drawings. Specifically, all or part of the device can be configured by functionally or physically separating or integrating any of the units depending on various loads or use conditions.

Furthermore, each of the processes described in the embodiments may be appropriately used in combination as long as the processes do not conflict with each other.

Furthermore, the "components (sections, modules, units)" described above can be read as "means", "circuits", or the like. For example, an acquiring unit can be read as an acquiring means or an acquiring circuit.

According to an aspect of an embodiment, an advantage is provided in that it is possible to appropriately authenticate a user in accordance with a context of the user.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An authentication apparatus comprising:
a processor operatively coupled to a memory, the processor being programmed to:
acquire a plurality of pieces of different context information on a plurality of users, including a target user, which is a target for authentication;
perform a first clustering by clustering groups of users of the plurality of users into a plurality of cluster groups based on information related to the plurality of cluster groups, each of the plurality of cluster groups being formed based on the plurality of different context information related to the groups of users of the plurality of users;

perform a second clustering by specifying and clustering sub-sets of the plurality of users from each of the plurality of cluster groups of users to form a plurality of belonging clusters of users, one of the plurality of belonging clusters including the target user, the second clustering performed in each of the plurality of cluster groups being performed on a candidate user group of the plurality of users that becomes a candidate for authentication based on a type related to an element included in the context information and based on the acquired context information on the target user;

perform a third clustering by specifying and clustering a plurality of candidate users that satisfy a predetermined condition from the plurality of belonging clusters, each of the plurality of candidate users being from a respective partial candidate user group of each of the specified belonging clusters, each candidate user of the plurality of candidate users being specified based on (i) applying a classification model to specify a predetermined candidate user in the partial candidate user group of the specified belonging cluster, and (ii) the acquired context information on the target user; and authenticate the target user based on information related to the specified candidate user associated with each of the plurality of the cluster groups.

2. The authentication apparatus according to claim 1, wherein the processor is programmed to specify the belonging cluster that is the cluster to which the target user belongs in each of the plurality of the cluster groups based on the information related to the plurality of the cluster groups each of which is based on a different type.

3. The authentication apparatus according to claim 1, wherein in accordance with the element associated with each of the plurality of cluster groups, the processor is programmed to specify the belonging cluster that is the cluster to which the target user belongs in each of the plurality of the cluster groups based on the plurality of cluster groups in each of which a number of clusters included in each of the plurality of cluster groups is determined.

4. The authentication apparatus according to claim 1, wherein the processor is programmed to specify a number of clusters in each of the plurality of cluster groups in accordance with the element associated with each of the plurality of cluster groups.

5. The authentication apparatus according to claim 1, wherein the processor is programmed to specify a candidate user that satisfies a predetermined condition of a classification score that is output by the classification model associated with the belonging cluster in one of the plurality of cluster groups, as a candidate user associated with the one of the plurality of cluster groups.

6. The authentication apparatus according to claim 1, wherein the processor is programmed to specify a plurality of candidate users that satisfy a predetermined condition of a classification score that is output by the classification model associated with the belonging cluster in one of the plurality of cluster groups, as candidate users associated with the one of the plurality of cluster groups.

7. The authentication apparatus according to claim 1, wherein the processor is programmed to change a number of the candidate users to be specified in each of the cluster groups in accordance with a number of the plurality of cluster groups.

8. The authentication apparatus according to claim 1, wherein the processor is programmed to authenticate the target user based on a frequency of appearance of each of the candidate users from among the candidate users associated with each of the plurality of cluster groups.

9. The authentication apparatus according to claim 1, wherein the processor is programmed to authenticate the target user as a most frequently appearing candidate user from among the candidate users associated with each of the plurality of cluster groups.

10. The authentication apparatus according to claim 1, wherein the processor is programmed to authenticate the target user based on a predetermined score that is associated with the candidate user associated with each of the plurality of cluster groups.

11. The authentication apparatus according to claim 1, wherein the processor is programmed to authenticate the target user as a candidate user having a maximum predetermined score from among the candidate users associated with each of the plurality of cluster groups.

12. The authentication apparatus according to claim 1, wherein the processor is programmed to specify the belonging cluster that is the cluster to which the target user belongs in each of the plurality of cluster groups based on the information related to the plurality of the cluster groups that include the cluster group in which clustering is performed on the candidate user group based on the type related to an attribute of a user.

13. The authentication apparatus according to claim 1, wherein the processor is programmed to specify the belonging cluster that is the cluster to which the target user belongs in each of the plurality of cluster groups based on the information related to the plurality of the cluster groups that include the cluster group in which clustering is performed on the candidate user group based on the type related to an action history of the user.

14. The authentication apparatus according to claim 1, wherein the processor is programmed to specify the belonging cluster that is the cluster to which the target user belongs in each of the plurality of cluster groups based on the information related to the plurality of the cluster groups that include the cluster group in which clustering is performed on the candidate user group based on the type related to a terminal device used by the user.

15. The authentication apparatus according to claim 1, wherein the processor is programmed to specify the belonging cluster that is the cluster to which the target user belongs in each of the plurality of cluster groups based on the information related to the plurality of the cluster groups that include the cluster group in which clustering is performed on the candidate user group based on the type related to a communication environment of the user.

16. The authentication apparatus according to claim 1, wherein the processor is programmed to specify the target user from the candidate users for each of the belonging clusters associated with each of the plurality of cluster groups based on the classification model that includes a plurality of judgment models associated with each of the users in the partial candidate user group that belongs to the specified belonging cluster.

17. The authentication apparatus according to claim 1, wherein the processor is programmed to specify the target user from the candidate users for each of the belonging clusters associated with each of the plurality of cluster groups based on the classification model that is a multi-class classification model of the partial candidate user group that belongs to the specified belonging cluster.

18. An authentication method performed by a computer comprising:
- acquiring a plurality of pieces of different context information on a plurality of users, including a target user, which is a target for authentication;
- performing a first clustering by clustering groups of users of the plurality of users into a plurality of cluster groups based on information related to the plurality of cluster groups, each of the plurality of cluster groups being formed based on the plurality of different context information related to the groups of users of the plurality of users;
- performing a second clustering by specifying and clustering sub-sets of the plurality of users from each of the plurality of cluster groups of users to form a plurality of belonging clusters of users, one of the plurality of belonging clusters including the target user, the second clustering performed in each of the plurality of cluster groups being performed on a candidate user group of the plurality of users that becomes a candidate for authentication based on a type related to an element included in the context information and based on the acquired context information on the target user;
- performing a third clustering by specifying and clustering a plurality of candidate users that satisfy a predetermined condition from the plurality of belonging clusters, each of the plurality of candidate users being from a respective partial candidate user group of each of the specified belonging clusters, each candidate user of the plurality of candidate users being specified based on (i) applying a classification model to specify a predetermined candidate user in the partial candidate user group of the specified belonging cluster, and (ii) the acquired context information on the target user; and
- authenticating the target user based on information related to the specified candidate user associated with each of the plurality of the cluster groups.

19. A non-transitory computer-readable recording medium having stored therein an authentication program that causes a computer to execute a process comprising:
- acquiring a plurality of pieces of different context information on a plurality of users, including a target user, which is a target for authentication;
- performing a first clustering by clustering groups of users of the plurality of users into a plurality of cluster groups based on information related to the plurality of cluster groups, each of the plurality of cluster groups being formed based on the plurality of different context information related to the groups of users of the plurality of users;
- performing a second clustering by specifying and clustering sub-sets of the plurality of users from each of the plurality of cluster groups of users to form a plurality of belonging clusters of users, one of the plurality of belonging clusters including the target user, the second clustering performed in each of the plurality of cluster groups being performed on a candidate user group of the plurality of users that becomes a candidate for authentication based on a type related to an element included in the context information and based on the acquired context information on the target user;
- performing a third clustering by specifying and clustering a plurality of candidate users that satisfy a predetermined condition from the plurality of belonging clusters, each of the plurality of candidate users being from a respective partial candidate user group of each of the specified belonging clusters, each candidate user of the plurality of candidate users being specified based on (i) applying a classification model to specify a predetermined candidate user in the partial candidate user group of the specified belonging cluster, and (ii) the acquired context information on the target user; and
- authenticating the target user based on information related to the specified candidate user associated with each of the plurality of the cluster groups.

* * * * *